US012160935B2

(12) United States Patent
Krietzman

(10) Patent No.: US 12,160,935 B2
(45) Date of Patent: Dec. 3, 2024

(54) VAPORIZING CONSUMABLES HEATED WITH CONVECTION AND CONDUCTION IN A PORTABLE DEVICE

(71) Applicant: Mark Krietzman, Palos Verdes Estates, CA (US)

(72) Inventor: Mark Krietzman, Palos Verdes Estates, CA (US)

( * ) Notice: Subject to any disclaimer, the term of this patent is extended or adjusted under 35 U.S.C. 154(b) by 0 days.

(21) Appl. No.: 18/592,335

(22) Filed: Feb. 29, 2024

(65) Prior Publication Data

US 2024/0206016 A1 Jun. 20, 2024

Related U.S. Application Data

(63) Continuation-in-part of application No. 18/133,991, filed on Apr. 12, 2023, now Pat. No. 11,979,949, which is a continuation-in-part of application No. 17/211,721, filed on Mar. 24, 2021, now Pat. No. 11,647,566, and a continuation-in-part of application (Continued)

(51) Int. Cl.

| | |
|---|---|
| ***H05B 1/02*** | (2006.01) |
| ***A24B 15/16*** | (2020.01) |
| ***A24F 40/40*** | (2020.01) |
| ***A24F 40/42*** | (2020.01) |
| ***A24F 40/46*** | (2020.01) |
| ***A24F 40/50*** | (2020.01) |
| ***H05B 3/14*** | (2006.01) |

(Continued)

(52) U.S. Cl.
CPC ........... *H05B 1/0244* (2013.01); *A24B 15/16* (2013.01); *A24F 40/40* (2020.01); *A24F 40/42* (2020.01); *A24F 40/46* (2020.01); *A24F 40/50* (2020.01); *H05B 1/0225* (2013.01); *H05B 3/146* (2013.01); *H05B 3/42* (2013.01); *A24F 40/60* (2020.01); *H05B 2203/014* (2013.01); *H05B 2203/021* (2013.01); *H05B 2203/022* (2013.01)

(58) Field of Classification Search
None
See application file for complete search history.

(56) References Cited

U.S. PATENT DOCUMENTS 4,947,874 A 8/1990 Brooks et al.
4,947,875 A 8/1990 Brooks et al.
(Continued)

FOREIGN PATENT DOCUMENTS

CN 1541577 11/2004
CN 101518361 9/2009
(Continued)

*Primary Examiner* — Ross N Gushi
(74) *Attorney, Agent, or Firm* — Mark H. Krietzman

(57) ABSTRACT

Disclosed herein are inventions for heating without combustion plant material or volatile compounds or oils in a disposable consumable such as a cartridge. The consumable upon insertion into a heating chamber or receivor is held in place and is restricted from rotation about its axis. The insertion may form indents or shaped portions of the consumable. It may have a case with a cartridge interface to receive the consumable into the heating system, a key guide, at least one heater element, an on/off switch, a battery, a temperature sensor; a controller in signal communication with the at least one heater element, battery, temperature sensor and the on/off switch.

8 Claims, 20 Drawing Sheets

Related U.S. Application Data

No. 17/147,030, filed on Jan. 12, 2021, now Pat. No. 11,770,877, which is a continuation of application No. 16/410,858, filed on May 13, 2019, now Pat. No. 10,893,707, said application No. 17/211,721 is a continuation of application No. 16/118,244, filed on Aug. 30, 2018, said application No. 16/410,858 is a continuation-in-part of application No. 15/898,629, filed on Feb. 18, 2018, said application No. 16/118, 244 is a continuation-in-part of application No. 15/045,410, filed on Feb. 17, 2016, said application No. 15/898,629 is a continuation-in-part of application No. 15/045,442, filed on Feb. 17, 2016.

(60) Provisional application No. 62/270,557, filed on Dec. 21, 2015, provisional application No. 62/208,786, filed on Aug. 23, 2015, provisional application No. 62/184,396, filed on Jun. 25, 2015, provisional application No. 62/127,817, filed on Mar. 3, 2015, provisional application No. 62/116,926, filed on Feb. 17, 2015.

(51) Int. Cl.

*H05B 3/42* (2006.01)
*A24F 40/60* (2020.01)

(56) References Cited

U.S. PATENT DOCUMENTS

| | | | |
|---|---|---|---|
| 5,144,962 | A | 9/1992 | Counts et al. |
| 5,269,327 | A | 12/1993 | Counts et al. |
| 5,388,594 | A | 2/1995 | Counts et al. |
| 5,530,225 | A | 6/1996 | Hajaligol |
| 5,649,554 | A | 7/1997 | Sprinkel et al. |
| 5,692,525 | A | 12/1997 | Counts et al. |
| 5,708,258 | A | 1/1998 | Counts et al. |
| 5,954,979 | A | 9/1999 | Counts et al. |
| 6,155,268 | A | 12/2000 | Takeuchi |
| 6,516,796 | B1 | 2/2003 | Cox et al. |
| 7,185,659 | B2 | 3/2007 | Sharpe |
| 9,032,968 | B2 | 5/2015 | Glasberg et al. |
| 9,084,440 | B2 | 7/2015 | Zuber et al. |
| 9,259,035 | B2 | 2/2016 | Terry et al. |
| 9,271,526 | B2 | 3/2016 | Liu |
| 9,414,629 | B2 | 8/2016 | Egoyants et al. |
| 9,451,791 | B2 | 9/2016 | Sears |
| 9,510,623 | B2 | 12/2016 | Tucker et al. |
| 9,516,899 | B2 | 12/2016 | Plojoux et al. |
| 9,532,603 | B2 | 1/2017 | Plojoux et al. |
| 9,609,894 | B2 | 4/2017 | Abramov et al. |
| 9,675,117 | B2 | 6/2017 | Li et al. |
| 9,775,380 | B2 | 10/2017 | Fernando et al. |
| 9,826,780 | B2 | 11/2017 | Krietzman |
| 9,854,841 | B2 | 1/2018 | Ampolini et al. |
| 10,076,137 | B2 * | 9/2018 | Krietzman ........... H05B 1/0244 |
| 10,130,780 | B2 * | 11/2018 | Talon ...................... A24F 40/53 |
| 10,238,764 | B2 | 3/2019 | Trzecieski |
| 10,299,515 | B2 | 5/2019 | Krietzman |
| 10,785,198 | B2 | 9/2020 | Pahl et al. |
| 10,885,734 | B2 | 1/2021 | Schoenfelder et al. |
| 10,982,899 | B1 | 4/2021 | Gelardi |
| 11,007,546 | B2 | 5/2021 | Hohmann et al. |
| 11,033,056 | B2 | 6/2021 | Gill et al. |
| 11,457,667 | B2 | 10/2022 | Krietzman |
| 2002/0179179 | A1 | 12/2002 | Volpenheim et al. |
| 2004/0089314 | A1 | 5/2004 | Felter et al. |
| 2007/0074734 | A1 | 4/2007 | Braunshteyn et al. |
| 2013/0218066 | A1 | 8/2013 | Duquet et al. |
| 2014/0014124 | A1 | 1/2014 | Glasberg et al. |
| 2014/0097207 | A1 | 4/2014 | Szymiczek et al. |
| 2014/0202476 | A1 | 7/2014 | Egoyants et al. |
| 2014/0366898 | A1 | 12/2014 | Monsees et al. |
| 2015/0040929 | A1 | 2/2015 | Hon |
| 2015/0150308 | A1 | 6/2015 | Monsees et al. |
| 2015/0284177 | A1 | 10/2015 | Patil et al. |
| 2015/0305406 | A1 | 10/2015 | Li et al. |
| 2015/0306617 | A1 | 10/2015 | Olegnowicz |
| 2015/0342257 | A1 | 12/2015 | Chen |
| 2016/0198771 | A1 | 7/2016 | Goggin et al. |
| 2016/0235124 | A1 | 8/2016 | Krietzman |
| 2016/0255879 | A1 | 9/2016 | Paprocki et al. |
| 2016/0278436 | A1 | 9/2016 | Verleur et al. |
| 2016/0331033 | A1 | 11/2016 | Hopps et al. |
| 2017/0108210 | A1 | 4/2017 | Meinhart et al. |
| 2017/0119051 | A1 | 5/2017 | Blandino et al. |
| 2017/0156407 | A1 | 6/2017 | Abramov et al. |
| 2017/0215478 | A1 | 8/2017 | Harrison et al. |
| 2017/0360092 | A1 | 12/2017 | Althorpe et al. |
| 2018/0030974 | A1 | 2/2018 | Cosgarea |
| 2018/0085551 | A1 | 3/2018 | Krietzman |
| 2018/0140001 | A1 | 5/2018 | Gabbay |
| 2019/0195852 | A1 | 6/2019 | Bryant, Jr. et al. |
| 2019/0373679 | A1 | 12/2019 | Fu et al. |
| 2020/0138117 | A1 | 5/2020 | Rosser et al. |
| 2020/0156826 | A1 | 5/2020 | Kilduff et al. |
| 2020/0377280 | A1 | 12/2020 | Pace et al. |
| 2021/0346616 | A1 | 11/2021 | Krietzman |
| 2021/0401061 | A1 | 12/2021 | Davis et al. |
| 2023/0232886 | A1 | 7/2023 | Robinson et al. |

FOREIGN PATENT DOCUMENTS

| | | |
|---|---|---|
| CN | 101606758 | 12/2009 |
| CN | 201379072 | 1/2010 |
| CN | 204393344 | 6/2015 |
| JP | 3164992 | 12/2010 |

* cited by examiner 383
381
384
350
380
381
382

383
385C
385B
385A
384
380
382
502

350
384
386
383
22
28
374
325
386

383
384

401
402
403
403
406
407
408
410A
410B
412
412
207

"S"
"F"
402
404
407
408
412

"A"
"A"
"B"
"B"
402
416
417

400
"AIE"
"IE"
402
408
410A
410B
412
412
500
500
500

402
407
412

412
420

VAPORIZING CONSUMABLES HEATED WITH CONVECTION AND CONDUCTION IN A PORTABLE DEVICE

RELATED APPLICATION

This application is a continuation of U.S. patent application Ser. No. 18/133,991 filed Apr. 12, 2023 and entitled "PORTABLE MULTIZONE INDUCTION VAPORIZER FOR TOBACCO CONSUMABLES" which is a continuation in part of U.S. patent application Ser. No. 17/147,030, filed Jan. 12, 2021, and entitled "PORTABLE TEMPERATURE CONTROLLED AROMATHERAPY VAPORIZERS" which is a continuation of U.S. Pat. No. 10,893,707, filed May 13, 2019 entitled "Portable Temperature Controlled Aromatherapy Vaporizers" which is a continuation of U.S. Pat. No. 10,299,515, filed Feb. 18, 2018 entitled "Dynamic Zoned Vaporizer" which is a continuation in part of U.S. Pat. No. 9,894,936, filed Feb. 16, 2016 and entitled "Zoned Vaporizer" U.S. Pat. No. 9,894,936 which claims the benefit of U.S. Provisional Pat. Applications Ser. No. 62/116,926 entitled CARTRIDGE AND HEATER filed on 17 Feb. 2015; Application Ser. No. 62/127,817 entitled MULTI ZONE VAPORIZER filed on 3 Mar. 2015; Application Ser. No. 62/184,396 entitled VAPORIZER DEVICE AND METHOD 25 Jun. 2015; Application Ser. No. 62/208,786 entitled VAPORIZER CARTRIDGE AND HEATER 23 Aug. 2015; Application Ser. No. 62/270,557 entitled THIN CONVECTION VAPORIZER filed 21 Dec. 2015 the disclosures of each of the above referenced applications are incorporated by reference herein in their entirety as if fully set forth herein.

This application is also a continuation of U.S. patent application Ser. No. 18/133,991 filed Apr. 12, 2023 and entitled "PORTABLE MULTIZONE INDUCTION VAPORIZER FOR TOBACCO CONSUMABLES" which is also a continuation of U.S. patent application Ser. No. 17/211,721, filed Mar. 24, 2021, and entitled "VAPORIZERS WITH CARTRIDGES WITH OPEN SIDED CHAMBER" which is a continuation of U.S. Pat. No. 10,986,872, filed Aug. 30, 2018 entitled "VAPORIZER AND VAPORIZER CARTRIDGES" which is a continuation of U.S. Pat. No. 10,076,137, filed Feb. 17, 2016 entitled "VAPORIZER AND VAPORIZER CARTRIDGES" which claims the benefit of U.S. Provisional Pat. Applications Ser. No. 62/116,926 entitled CARTRIDGE AND HEATER filed on 17 Feb. 2015; Application Ser. No. 62/127,817 entitled MULTI ZONE VAPORIZER filed on 3 Mar. 2015; Application Ser. No. 62/184,396 entitled VAPORIZER DEVICE AND METHOD 25 Jun. 2015; Application Ser. No. 62/208,786 entitled VAPORIZER CARTRIDGE AND HEATER 23 Aug. 2015; Application Ser. No. 62/270,557 entitled THIN CONVECTION VAPORIZER filed 21 Dec. 2015 the disclosures of each of the above referenced applications are incorporated by reference herein in their entirety as if fully set forth herein.

BACKGROUND OF THE DISCLOSURE

Field of the Disclosure

The present disclosure relates generally to heating system and device that releases organic residues from essential oils, extracts and plant based material upon appropriate heating and releases or vaporizes the organics without combustion.

Related Art

Vaporizer for plant based materials and essential oils and exist. Vaporizers which allow a fluid gas containing the vapor and other residues to follow a fluid pathway from source of vapor to user inhalation exist. *Cannabis*, tobacco and other botanicals have been known in the art to be vaporized or burned to release organic material in the form of inhalable material. Vaporizing at correct temperatures can boil off the compounds and oils for inhalation without combusting the plant material.

Vaporization allows aromatherapy or inhalation. Herbs and botanicals have been known in the art to be vaporized or burned to release organic material in the form of inhalable material.

Lavender vaporizes at 260° F. Tobacco vaporizes between 257° F. to over 450° F. Green tea vaporizes between about 175° C. to over 185° C. Valerian vaporizes at about 235° C. Chamomile used to aid in the relief of anxiety vaporizes at about 380° F. Peppermint vaporizes at about 255° F. Peppermint is also known to ease symptoms of allergies and asthma, in addition to alleviating some of the side effects that come along with the common cold or a sinus infection. *Cannabis*, has a range at which it can be heated to release different cannabinoids as vapor without burning the organic material from below 200 F to about 430 F.

Heating a cartridge configured to contain organic plant material and/or infused oils on a carrier material may, in some instances, overheat at least portions thereof and therefore combust, overheat or otherwise release unwanted substance which may include carcinogens and chemicals into the vapor.

Uneven heating of a consumable in a heating chamber can result in uneven use of the consumable, charring and in some instances combustion.

Heating a chamber loaded with organic material may, in some instances, overheat at least portions thereof and therefore combust, overheat or otherwise release unwanted items which may include carcinogens and chemicals into the vapor.

It is therefore a desideratum to have a device, method and or system wherein such heating avoids combustion and/or uneven heating.

DESCRIPTION

Disclosed herein are exemplary implementations for heating without combustion plant material or volatile compounds or oils in a disposable consumable such as a cartridge. The consumable upon insertion into a heating chamber or receivor is held in place and is restricted from rotation about its axis. The insertion may form indents or shaped portions of the consumable. It may have a case with a cartridge interface to receive the consumable into the heating system, a key guide, at least one heater element, an on/off switch, a battery, a temperature sensor; a controller in signal communication with the at least one heater element, battery, temperature sensor and the on/off switch.

Aspects of systems and methods disclosed include methods of heating without combusting material within a disposable consumable. A disposable consumable containing material is inserted into a receivor configured with a key guide with at least one heating element and at least one temperature sensor in thermal communication with the receivor, a controller in signal communication with a power supply and the at least one heating element and the at least one temperature sensor is configured to initiate heating if said consumable is inserted into the receivor. In some instances the consumable further comprises a containment end configured to contain the material. In some instances at least the containment end is formed of at least paper and metal and in some instances the metal is a foil. In some instances the material is tobacco.

Aspects of systems and methods disclosed include methods of heating without combusting material within a disposable consumable. A disposable consumable containing material is inserted into a receivor configured with a key guide with at least one heating element and at least one temperature sensor in thermal communication with the receivor, a controller in signal communication with a power supply and the at least one heating element and the at least one temperature sensor is configured to initiate heating if said consumable is inserted into the receivor and the controller is configured to communicate states of heating to the user. In some instances the communication to the user is by way of illumination. In some instances the communication to the user is by way of a vibration. In some instances the controller receives temperature sensor measurements and applies heat at a selected exposure temperatures (SET) to a portion of the containment area in accordance with one of variable and fixed times. The methods may further include connecting at least one temperature sensor to the controller and wherein the controller in response to temperature sensor measurements adjusts the amount and/or timing of electricity provided to a turned-on heating. In some instance the method includes communicating via illumination if the temperature of at least a portion of the receivor is at a predetermined temperature.

Aspects of systems and methods disclosed include systems of heating without combusting material within a disposable consumable, including a disposable consumable having an inhalation end and containing a material to be heated in a containment end insertable into a receivor via a key hole or key guide configured to retain the inserted consumable. At least one heating element and at least one temperature sensor in thermal communication with the receivor, a power supply, controller in signal communication with the power supply, the at least one heating element and the at least one temperature sensor configured to initiate heating if said consumable is inserted into the receivor. In some instances the containment end is formed of at least paper and metal. In some instances the material includes at least a portion of tobacco.

Aspects of systems and methods disclosed include systems of heating without combusting material within a disposable consumable, including a disposable consumable having an inhalation end and containing a material including at least some tobacco to be heated in a containment end insertable into a receivor via a key hole or key guide configured to retain the inserted consumable. At least one heating element and at least one temperature sensor in thermal communication with the receivor, a power supply, controller in signal communication with the power supply, the at least one heating element and the at least one temperature sensor configured to initiate heating if said consumable is inserted into the receivor and the controller is configured to communicate states of heating to the user. In some instances communication to the user is by way of illumination. In some instances the communication to the user is by way of a vibration.

Aspects of systems and methods disclosed include systems of heating without combusting material within a disposable consumable, including a disposable consumable having an inhalation end and containing a material including at least some tobacco to be heated in a containment end insertable into a receivor via a key hole or key guide configured to retain the inserted consumable. At least one heating element and at least one temperature sensor in thermal communication with the receivor, a power supply, controller in signal communication with the power supply, the at least one heating element and the at least one temperature sensor configured to initiate heating if said consumable is inserted into the receivor and key guide at least one of indents, squeezes and shapes at least a portion of the consumable. In some instances a volume of air is heated in the receivor between the consumable and interior wall of the receivor. During use at least a portion of the volume of heated air is passes through the consumable when a user inhales on the inhalation end of said consumable.

FIGURES

The invention may be better understood by referring to the following figures. The components in the figures are not necessarily to scale, emphasis instead being placed upon illustrating the principles of the invention. In the figures, like reference numerals designate corresponding parts throughout the different views.

Figures 16, 17, 18, 19A, 19B, 20:
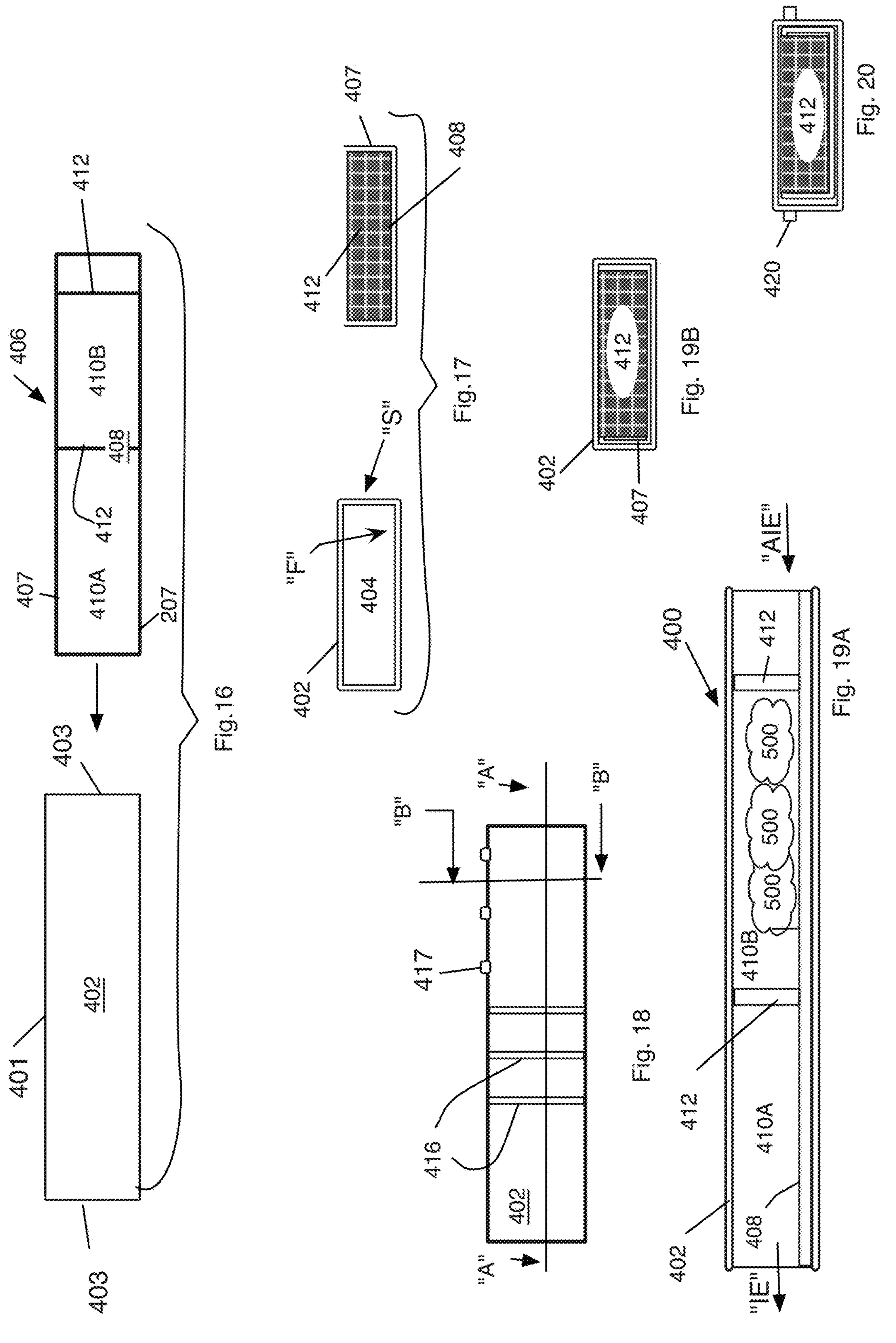
FIGS. 16 and 17 illustrate aspects of disposable cartridges for use with cartridge interface heater.
FIG. 18 illustrates an assembled cartridge.

FIGS. 19A and 19B illustrated cut-away views of the cartridge of FIG. 18 along the lines of A-A and B-B.

FIG. 20 illustrates a cartridge with alignment key to limit up-down insertion to one orientation.

Figure 21A:
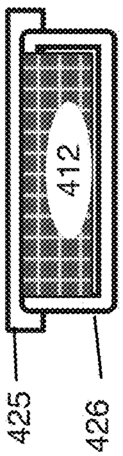
Figure 21B:
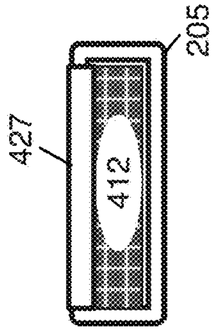
Figure 21C:
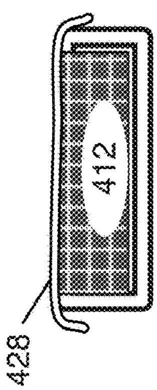

FIGS. 21A-21C illustrate alternative covers for disposable cartridges.

Figure 22A:
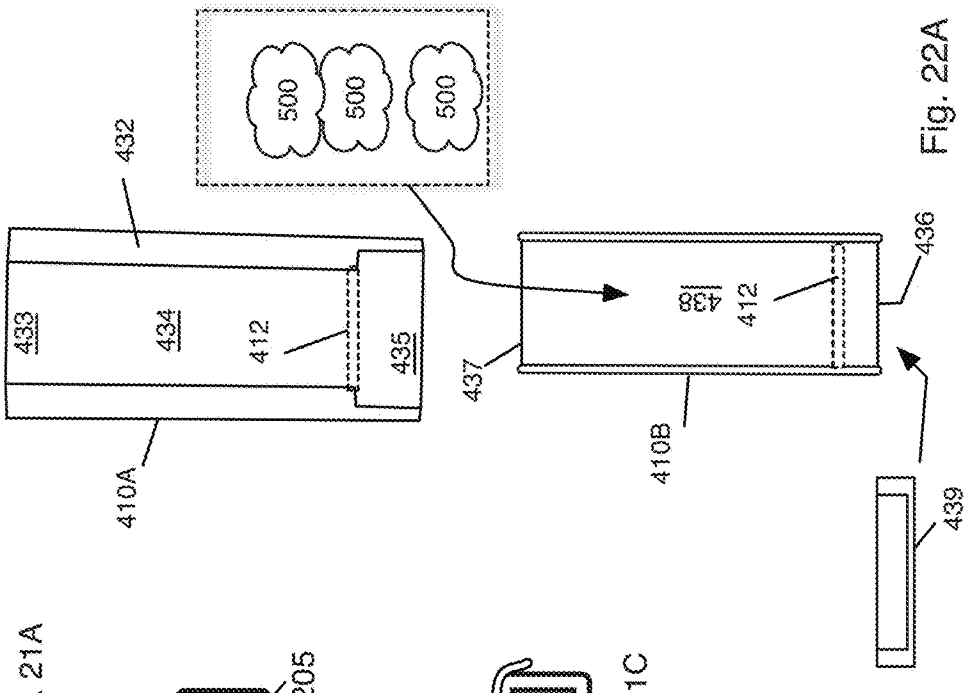
Figure 22B:
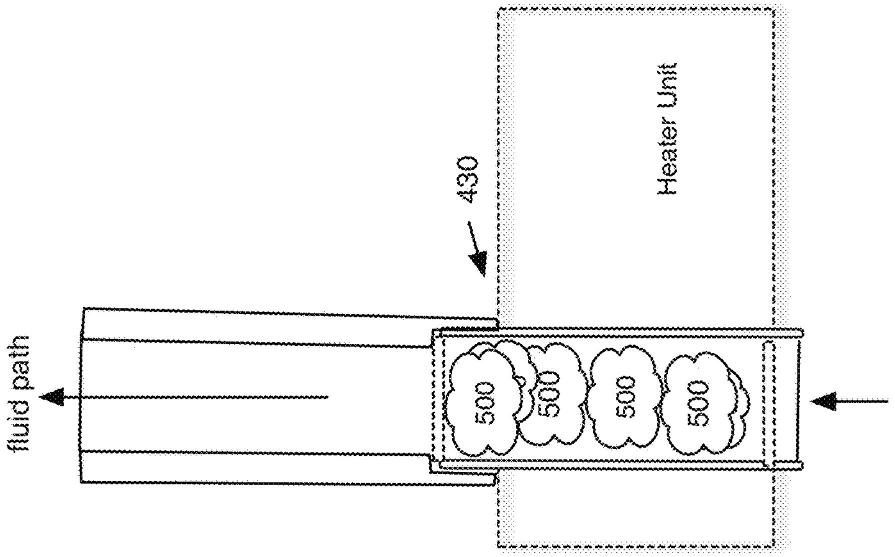

FIGS. 22A-22B illustrate a tubular fillable cartridge.

Figure 23D:
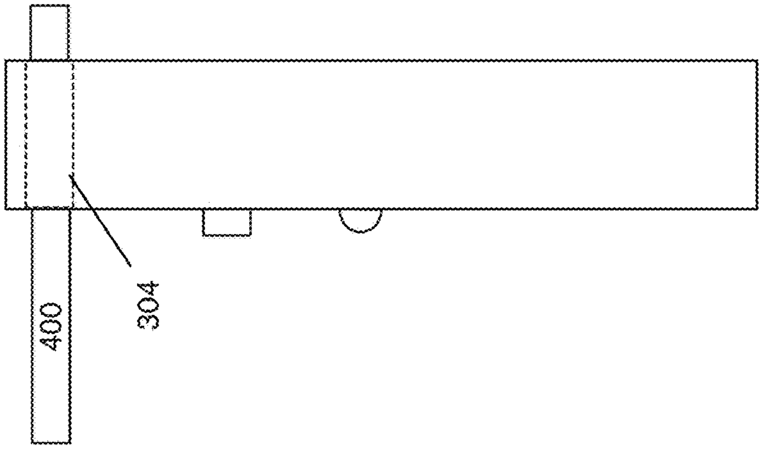
Figure 23C:
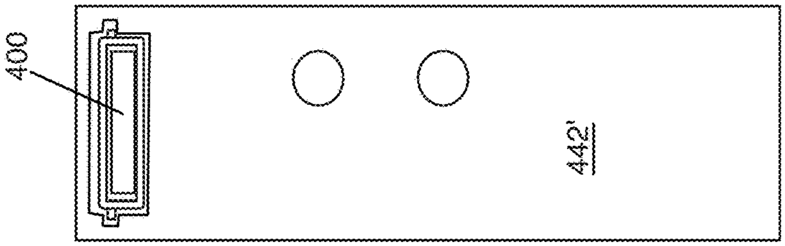
Figure 23B:
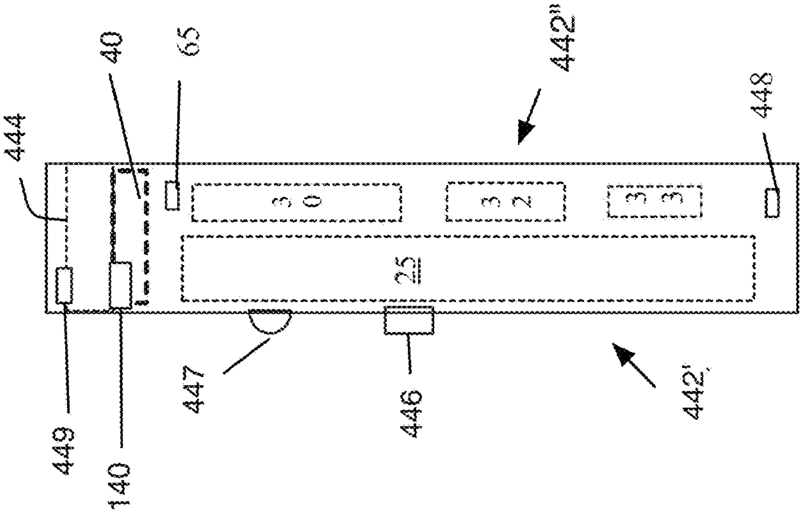
Figure 23A:
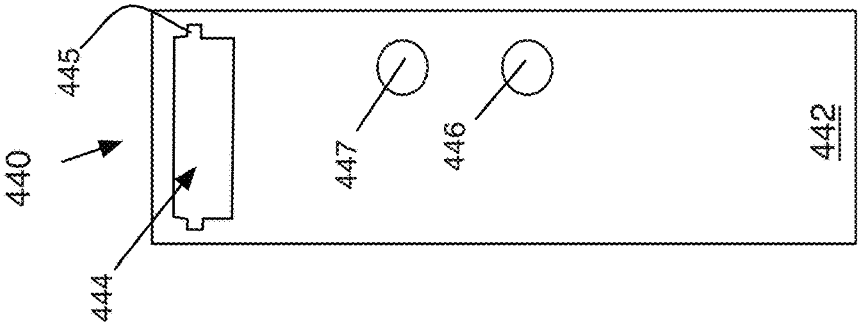

FIGS. 23A-22G illustrate a heater with disposable cartridge interface and use of the heater with a movable cartridge.

Figure 24:
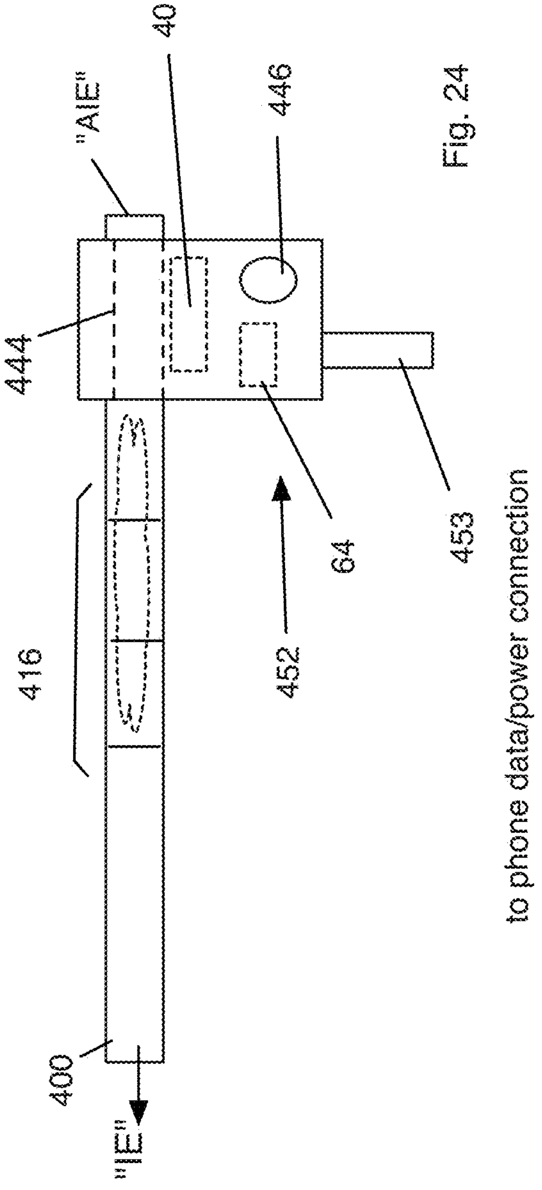
Figure 25:
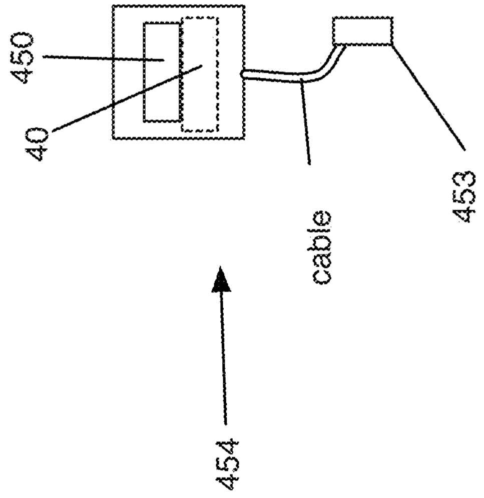

FIGS. 24 and 25 illustrate heater devices for use with a smartphone or other power supply.

Figure 26:
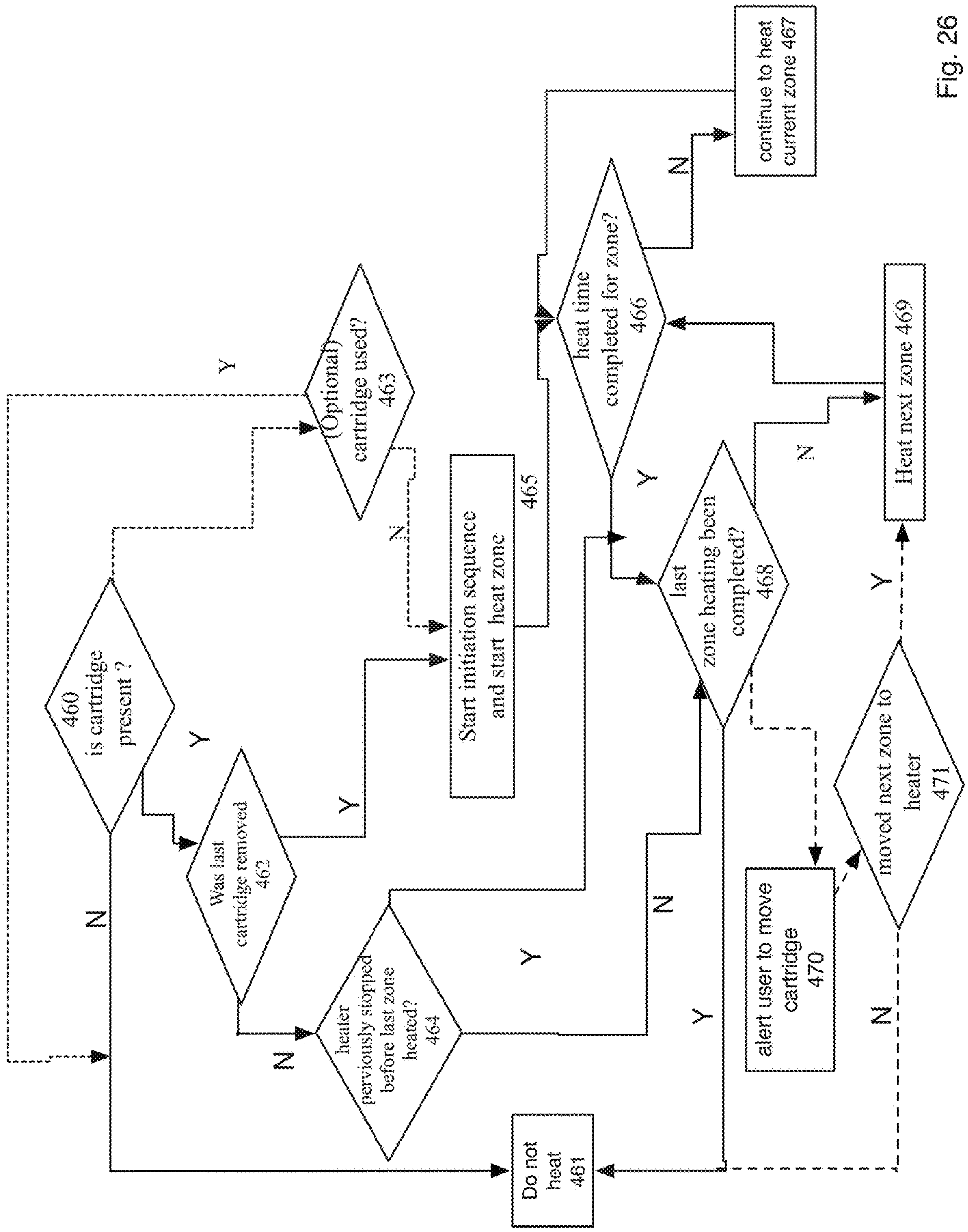

FIG. 26 shows aspects of controller logic for heating zones in a multi-zone vaporizer device.

Figure 27:
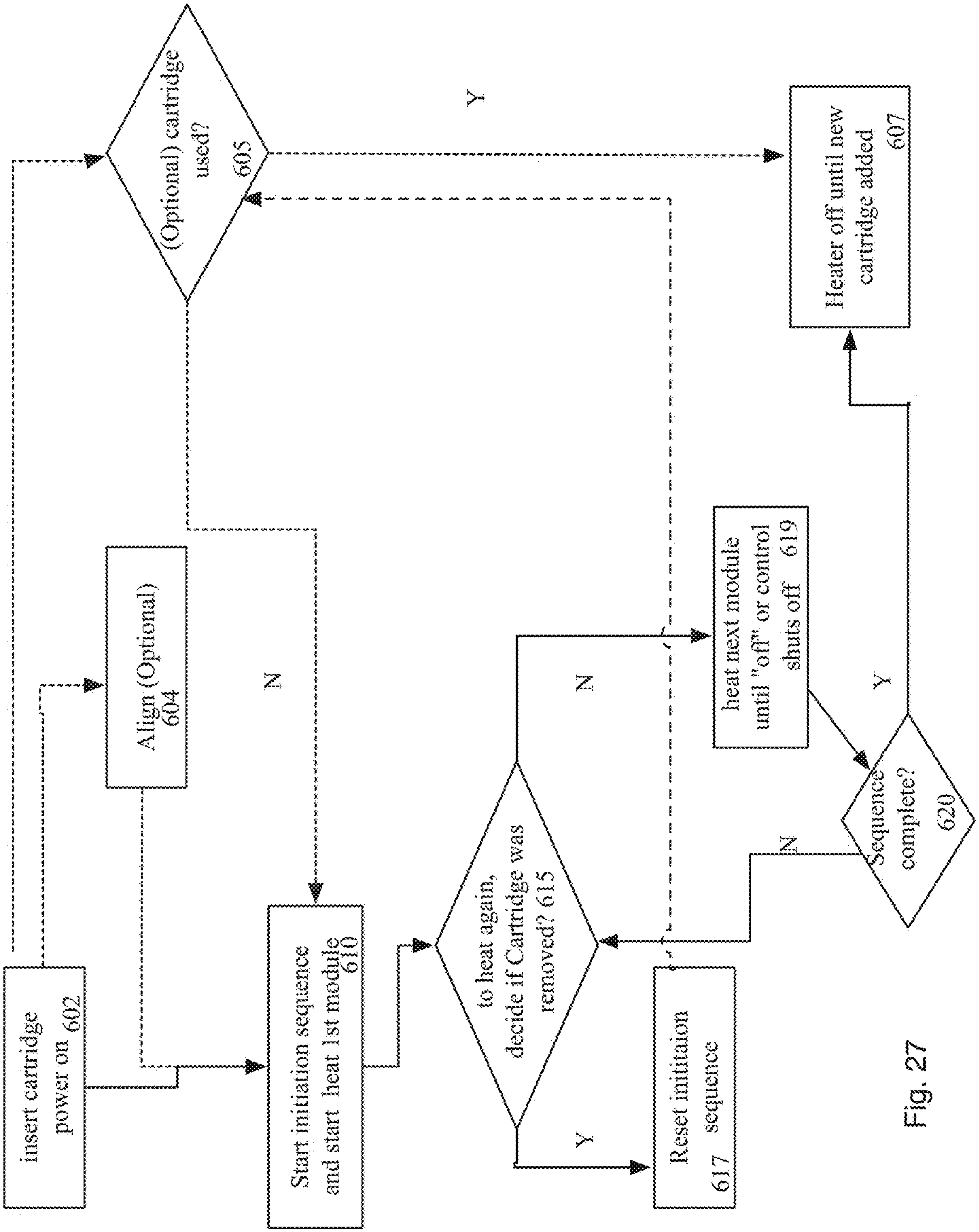
Figure 28:
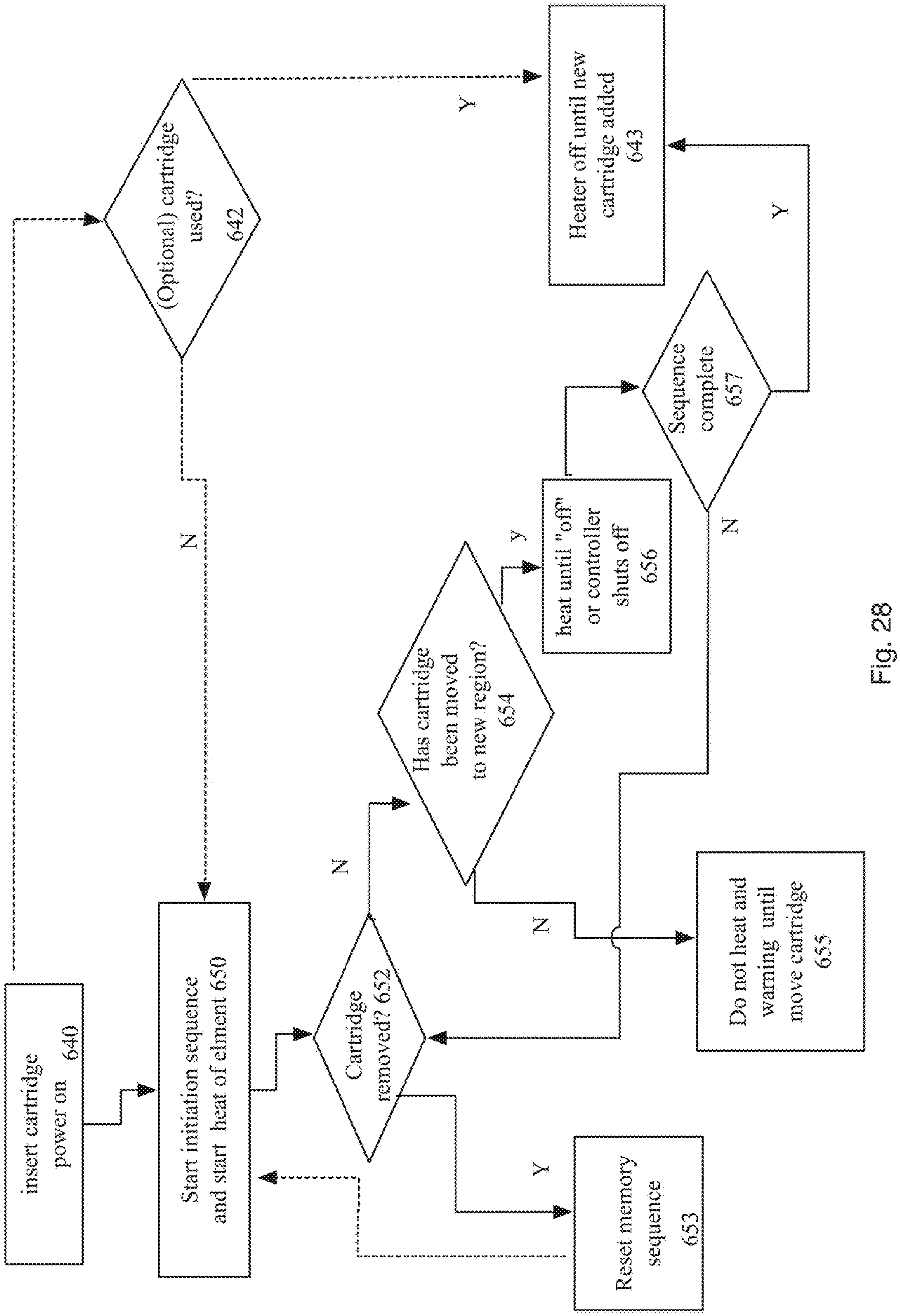
Figure 29:
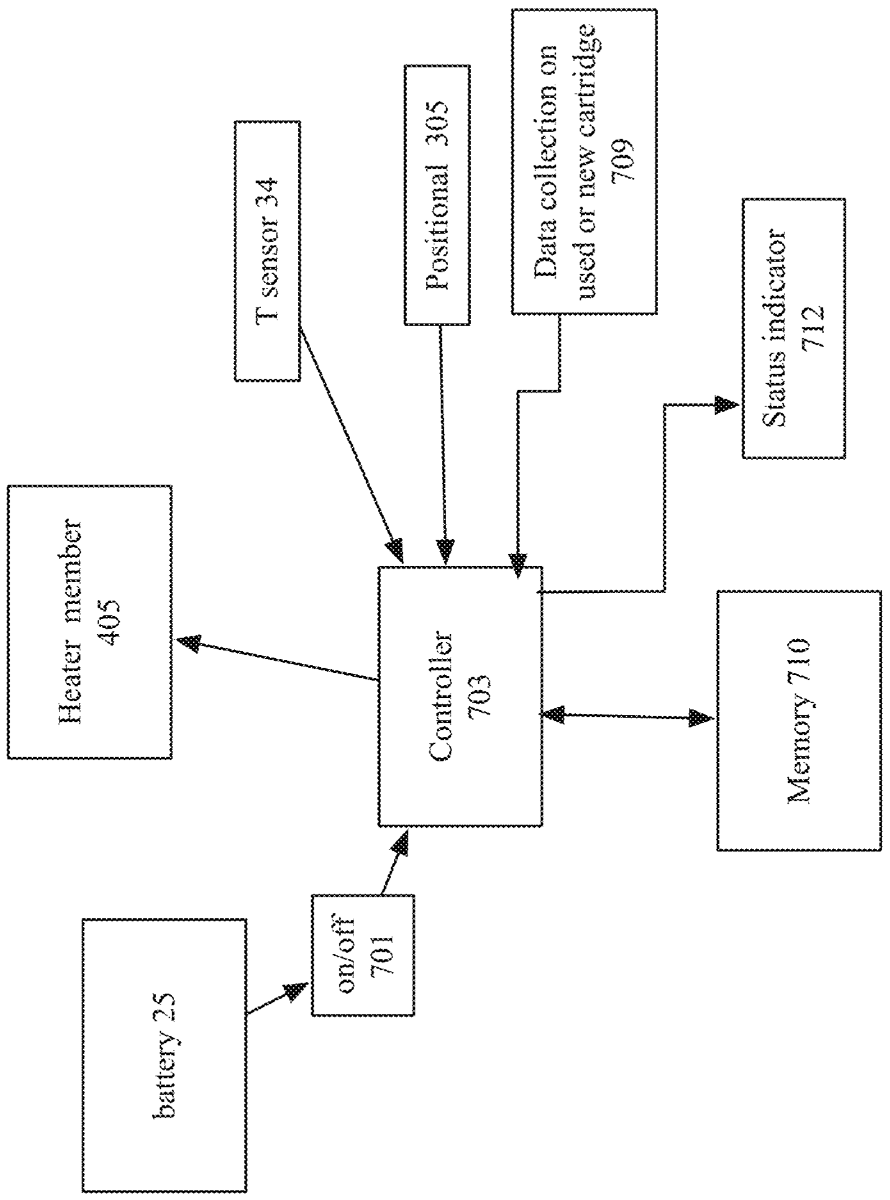

FIGS. 27-29 illustrates aspects of a control sequence and sequence of operation of a vaporizer device.

All descriptions and callouts in the Figures and all content therein are hereby incorporated by this reference as if fully set forth herein.

FURTHER DESCRIPTION

A vaporizer system, device and method which provides for heating of a cartridge or a section thereof is disclosed. Cartridges are preferably disposable but in some instances may be refillable. Vaporizing plant material for inhalation of plant borne chemicals is considered by some to be less harmful than combusting the plant material. Tobacco and *cannabis* are examples of such material.

Traditional portable vaporizers provide a flow pathway from heating unit to inhalation path to user. Those pathways and the heating chamber become covered with sticky residue of organic materials, oils and plant material. When vaporizing extracts or oils a carrier or binder material or substrate may be in the heating chamber of traditional devices forming waste products and odors. These wastes and residues must be removed and can be hard to remove, they can block fluid passage and they are odiferous.

The instant disclosure teaches refillable cartridges and disposable inhalation cartridges for use with and in a heater base wherein the cartridge contains the organic material to be vaporized. Cartridges may be tubular, conical, or flat. Some cartridges are multipart. Cartridges may have sections which are formed of different materials with different properties to facility at least one of strength, insulation, conduction, ease of use, thermal transfer for heating, and containment for the plant material or for extract therein. In some instance a cartridge is disposable having contained material for vaporization to prevent direct contact with the heater or a heater chamber thereby reducing the clogging, odiferousness, vapor condensate material or other build up within the heater or heating chamber. In some instance the fluid pathway from the organic material to the inhalation point is integral to the cartridge and disposable thereby reducing the clogging, odiferousness, vapor condensate material or other build up in the fluid pathway.

It is appreciated that circuits, components, controllers, modules, and/or devices of the system described as being in signal communication with each other, where signal communication refers to any type of communication and/or connection between the circuits, components, modules, and/or devices that allows a circuit, component, module, and/or device to pass and/or receive signals and/or information from another circuit, component, module, and/or device. The communication and/or connection may be along any signal path between the circuits, components, modules, and/or devices that allows signals and/or information to pass from one circuit, component, module, and/or device to another and includes wireless or wired signal paths. The signal paths may be physical such as, for example, conductive wires, electromagnetic wave guides, attached and/or electromagnetic or mechanically coupled terminals, semiconductive or dielectric materials or devices, or other similar physical connections or couplings. Additionally, signal paths may be non-physical such as free-space (in the case of electromagnetic propagation) or information paths through digital components where communication information is passed from one circuit, component, module, and/or device to another in varying analog and/or digital formats without passing through a direct electromagnetic connection. These information paths may also include analog-to-digital conversions ("ADC"), digital-to-analog ("DAC") conversions, data transformations such as, for example, fast Fourier transforms ("FETs*), time-to-frequency conversations, frequency-to-time conversions, database mapping, signal processing steps, coding, modulations, demodulations, etc. The controller devices and smart devices disclosed herein operate with memory and processors whereby code is executed during processes to transform data, the computing devices run on a processor (such as, for example, controller or other processor that is not shown) which may include a central processing unit ("CPU"), digital signal processor ("DSP"), application specific integrated circuit ("ASIC"), field programmable gate array ("FPGA"), microprocessor, etc. Alternatively, portions DCA devices may also be or include hardware devices such as logic circuitry, a CPU, a DSP, ASIC, FPGA, etc. and may include hardware and software capable of receiving and sending information.

In some instances the heater is a single heater placed or moved into proximity with the material (in the cartridge) to vaporize wherein heat is supplied to and through the cartridge or a portion thereof. In some instances a controller, such as a microprocessor with hardware and/or software logic turns on/off heating element. In some instance multiple heating elements are used to form zones to heat different sections of the cartridge at different times.

In some instances the cartridge has limited orientations of insertion to hold it fixed in the heater and unable to rotate about its axis. In some instances the cartridge has a frangible tab or identifier which is broken on insertion to prevent reuse of a spent cartridge. In some instances the cartridge is marked with an identifier that is stored in memory to turn off the heater if the cartridge has already been used.

The instant disclosure also teaches aspects of one or more reusable inhalation cartridges (also sometimes referred to as carriages) and a heater base wherein the cartridge has a chamber containing organic material to be vaporized. A fluid pathway for air to pass through organic material being heated for vaporization to the inhalation point is integral to the cartridge. In some instances heater elements are arrayed and the controller or controllers turn heater elements on/off to apply heat to a selected portion or portions of the cartridge at a time. In other instances the cartridge is moved across a single heater to bring a portion of the cartridge into close proximity to the heating element. In some instances tactile or visual cues are provided to a user to enable movement of the cartridge along a path between portions of the chamber for sequence local heating FIGS. 1, 2, 3,and 4 show elongated cartridges 1 with two ends; the first end 2 is an inhalation (or intake) end or portion and the second end 3 is a containment (or heating) end or portion. During use a cartridge is mated with a case providing a heater which is controlled to supply heat or heated air at a predetermined temperature to cause vaporization. For vaporization and ingestion of vapor, air is drawn into the cartridge by inhalation (not shown) into the open front 5 to the containment end 3 and then through the inhalation end 2, vapor released from material in the cartridge will flow with the air moving through the cartridge, and finally air and vapor move out through the open back 6. A frangible section 7 may be formed on the cartridge whereby it will be deformed during insertion. In some instance an optional ID 8 is added which verifies cartridges status as used or not used via memory accessible from the controller. In some instances perforations 10 may be formed in the containment end 3 to reduce thermal resistance to heat flow from heating elements by the cartridge material. In some instances a filter or flavor filter 12 is placed in the inhalation end 2 whereby vapor inhaled passes. The filter can remove some materials from the vapor and the flavor filter adds an inhalable flavor to the vapor. A flow through divider 15 such as a screen or coarse filter which allows vapors to pass through may be positioned in the cartridge between the containment and inhalation ends. A flow through divider may also be positioned at or near the open end 5. Organic matter 500 is placed in the containment 3 for use of the cartridge. The organic material is a material containing oils or resins (such as *cannabis*) which can be released via heating. Extract containing organic material such as oils and resins extracted from *cannabis* may be placed in the cartridge. It may also be placed or bound with a binder or carrier material/compound. Carrier materials include but are not limited paper, wools, fabric, plastic, hemp, and other material that does not outgas toxic or harmful chemicals or fumes at the temperatures necessary to vaporize the extract.

The cartridge may be formed of a disposable material which will not burn or release toxic or harmful fumes at temperatures that are reached by the heater in the device. In generally for many organic materials the temperature of vaporization will be between 320 F to over 420 F. The cartridge may be scarred by the heating process as it is disposable. Paper, fibers such as cotton and hemp, metal, foil, plastic, resins, thermo plastics, wool, ceramics, ceramic doped paper, glass, PEEK, and combination thereof may be suitable material for some or all of the cartridge. The cartridge maybe made of different materials for different regions. For example the containment portion 3 is subjected to the greatest heat. The material must be suitable to transfer a sufficient portion of the heat applied to its surface through its wall and into the containment portion to thereby cause vapor of the organic material 500.

The cartridge heating portion being constructed to withstand between about 3-12 minutes of periodic heating to a temperature adequate to vaporize oils or resins within *cannabis* without substantially burning the containment portion, intake (inhalation end) portion or the organic material.

During use the cartridge 1 is inserted in a heater 20 via the pathway of arrow 1000. This also may be referred to as a pass-through cartridge device. The example of the passing the cartridge through the heater is not a limitation and those of ordinary skill in the art will recognize that a non-pass-through configuration is within the scope of this disclosure. The heater 20 has a case 22 with an interface 24 to a receivor 23. The receivor also referred to as a cartridge guide or heating chamber The receivor 23 is a channel within the case which is configured for entry and removal of a cartridge. The receivor both holds a cartridge and can be configured for thermal communication to transfer heat from a heater or heaters outside the receivor to the interior annular wall 23A of the receivor which is in thermal communication with a heater system whereby heat form the heating system can be provided to the containment end 3 holding material to vaporize. Accordingly, plant material in a cartridge placed in a receivor can be heated through the wall of the receivor and the wall of the cartridge.

Those of ordinary skill in the art will recognize that a less than complete perimeter wrap of the cartridge is within the scope of this disclosure. A cartridge may be fitted in a three sided receiver and partially extend out of it and still be within the scope of this disclosure.

Within the case is a battery 25. A cartridge identification reader 26 such as an optical reader, an emitter receiver, a pressure sensor and the like may also be added to the device. The identification reader is a sensor that verifies one or more of a cartridge's presence, ID and visa vie the controller (which may include utilizing the memory associated therewith) the controller determines if the cartridge has previously been used. The controller may determine that a heat indicator (such as a color change region) has previously been heated, it may determine that a code is ablated (by the heat of prior use) or is not present thereby preventing heating. An on/off switch 27 is shown, and battery may have a charging input/output (I/O) 28 (or it may be a replaceable battery). The case may also have a mechanical or electrical mechanical actuator 29 that is activated by the presence of the frangible section 7 and also deforms said frangible section upon insertion. Actuation is the communication of the actuator 29 to the controller whereby the controller 30 recognizes the cartridge as "inserted". In the case of a cartridge with a frangible tab it also conveys that the cartridge's tab is present and that can indicate the cartridge is new. Once the cartridge is verified as present and/or new the controller 30 is configured to switch on electrical current to the heating element(s). Within the case is the controller 30. The controller is a microprocessor which may have memory 32 and which controls certain operations of the vaporizer device. Operations may include one or more of time, date, location, security code, on/off, sequence of heating, temperature, indicator display of the heater, battery charging, battery management, battery state of charge indication, cartridge verification. The controller is in signal communication with other electrical and power components. Those of ordinary skill in the art will recognize that blue tooth, WIFI 33 or other wireless or wired connection to a smart phone or computer may also be used to perform some of the controller functions and that would be within the scope of this disclosure. One or more temperature sensors 34 such as thermistors and thermocouples are within the case and near the receiver 23.

The case 22 contains one or more heating elements 40. One or more heater vents 42 may be provided. Although four heating elements are shown those of ordinary skill in the art will understand that what is disclosed is one or more zones. In some instance only a single heating zone may be provided, in other instances multiple zones may be utilized and such is within the scope of this disclosure.

In some exemplary implementations a multi-zone heater is disclosed it may have heat zone "A" to zone "N". A cartridge, during use, will have corresponding zones "AA" to "NN" which align generally with the heat zones. The heat at least partially circle the receivor 23. The heating elements wrapping around the receivor form the corresponding zones "AA"-"NN" which are analogous to sausage slices."

During use one or more zones may be turned on to supply heat, via heating elements, to heat organic material 500 and release vapor. The vapor is drawn in via inhalation by the user. Sequencing the zones for heating is advantageous in that it can reduce peak power consumption. Sequencing the zones for heating is also advantageous in that it can release vapor from a discreet amount of organic material at one time thereby leaving unheated areas of organic material with the same cartridge for a next use. Many terpenes in vaporize at temperatures below the vaporization of THC and by sequence zone heating these terpenes are released in a sequence whereby a later inhalation or a second user inhalation which follows the first heating and inhalation will also receive terpenes. By zoned heating more of the compounds in the organic material which can be vaporized are available, each from a discreetly heated zone then would be for material heated together which can overheat. Sequential heating reduces overheating and supports continuous use while reducing over heating which for at least *cannabis* results in singeing the material which is commonly referred to as a "popcorn" taste.

Figure 1:
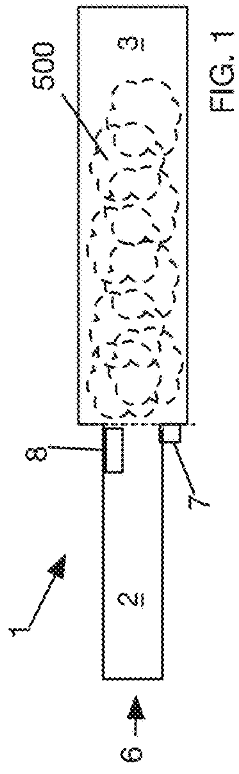
FIGS. 1-5 illustrate aspects of cartridge modules and associated heater.
Figure 2:
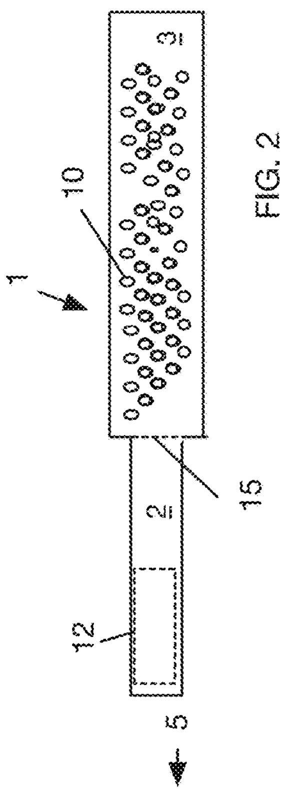
Figure 3:
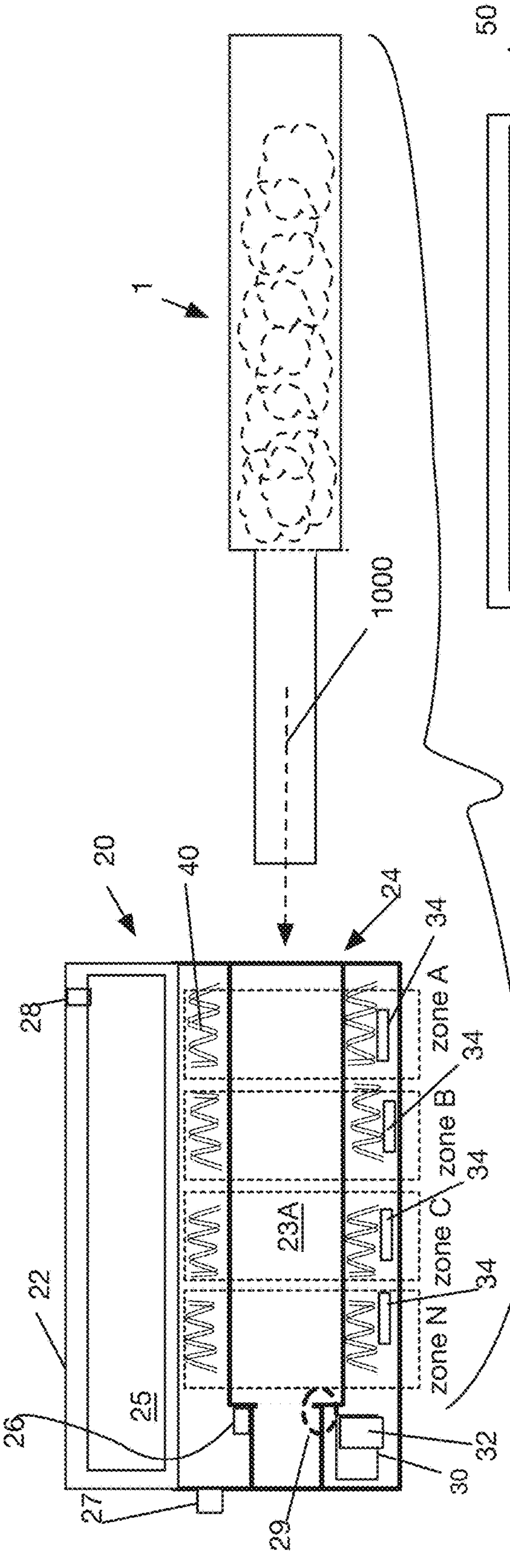
Figure 4:
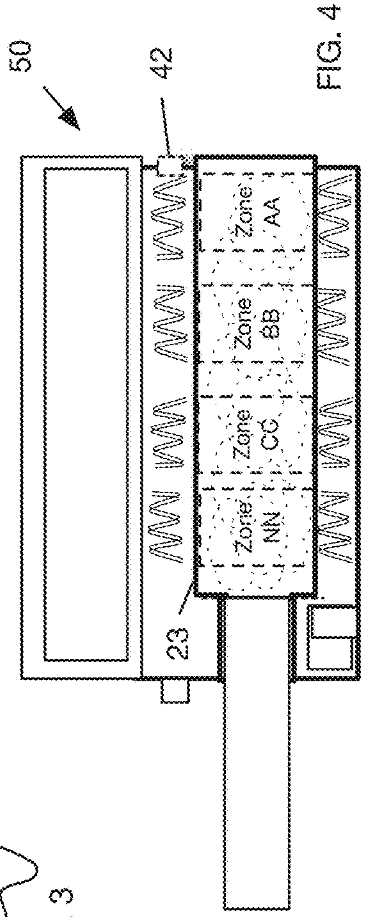
Figure 6:
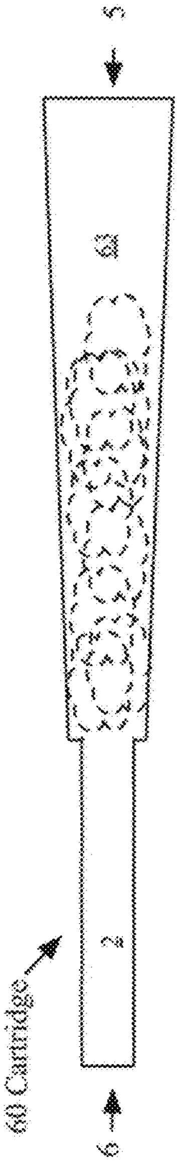
FIGS. 6-7 illustrate aspects of a cone cartridge module and associated heater.
Figure 7:
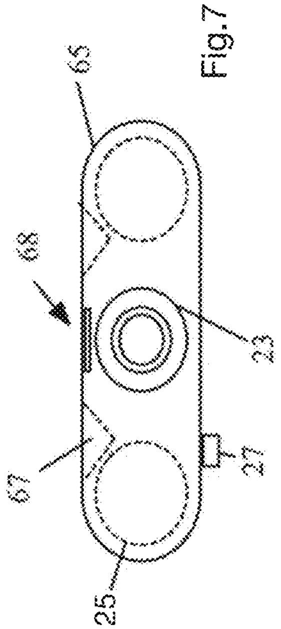
Figure 5:
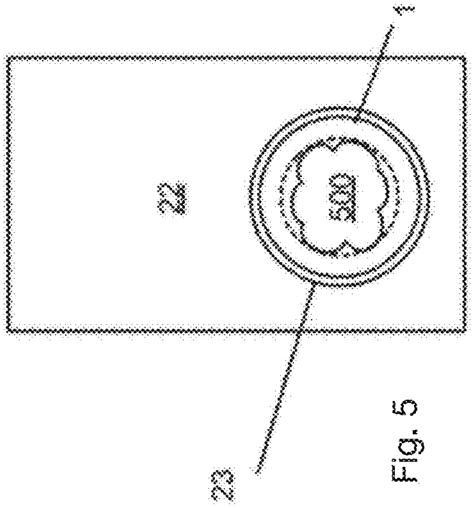

FIGS. 6 and 7 show aspects of another exemplary implementation of a cartridge containing organic material and a heater device. The cartridge 60 has a conical containment 63 and the receiver interface 23 is shaped to accommodate the conical shape.

Figure 8B:
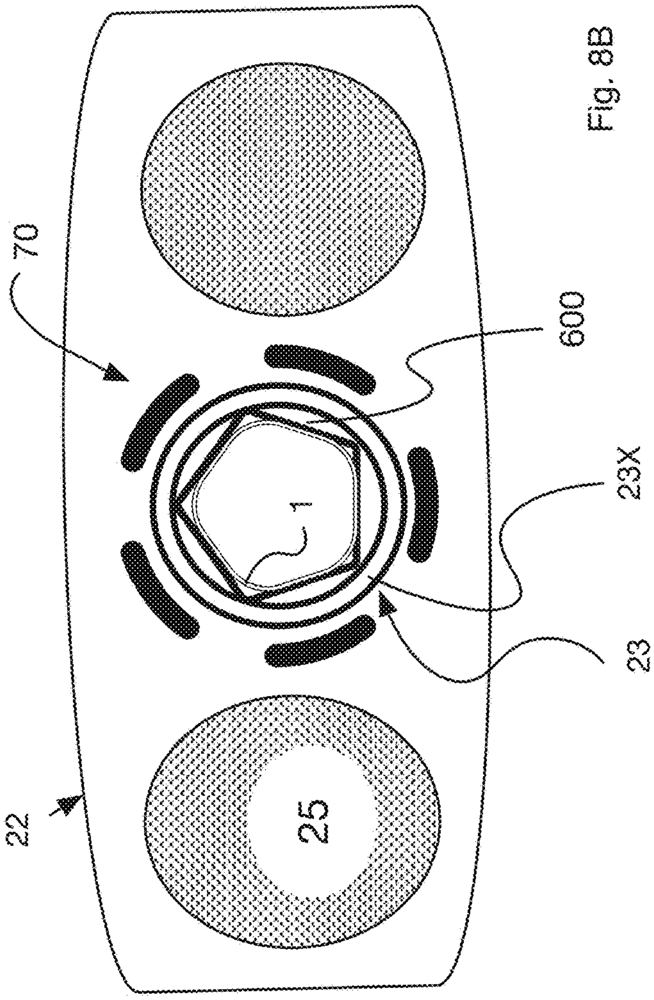
FIGS. 8A-8B illustrate aspects of a cartridge module with keyed receivor and vertical heaters.
Figure 8D:
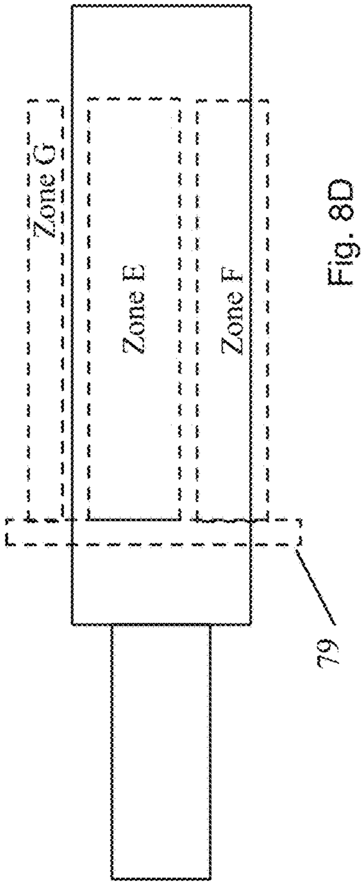
FIGS. 8C-8D illustrate aspects of a cartridge module with vertical heaters.
Figure 8A:
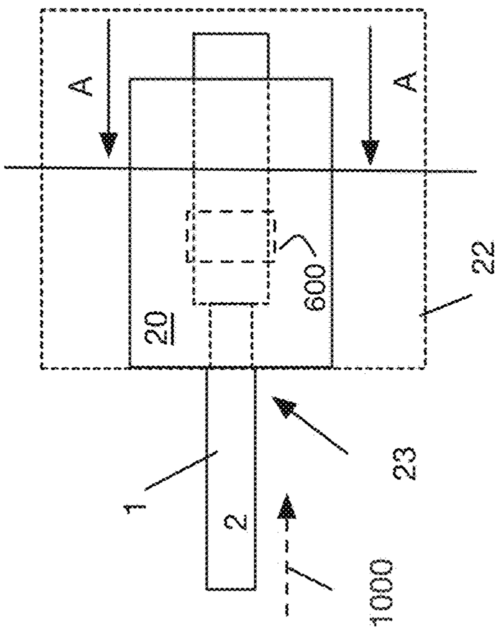
Figure 8C:
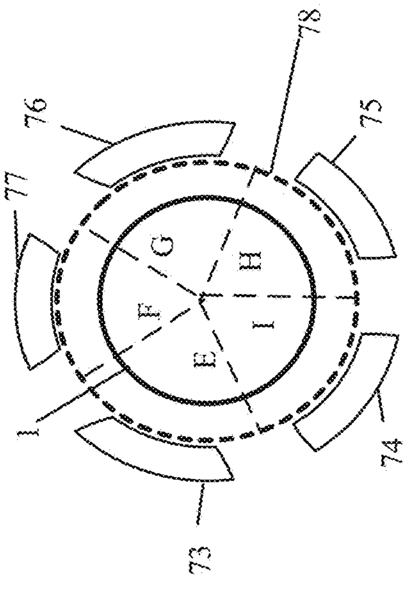

FIGS. 8A-8D shows aspects of another exemplary implementation of the cartridge and heater device. A heater 20 in a case 22 heats a disposable cartridge 1. FIG. 8B is a cut-away view from line "A-A" of FIG. 8A, it shows a receivor 23 and a key guide portion 600 and cartridge 1 looking up the receivor towards the key guide portion 600 remote from the end of the receivor 23X. The key limits cartridge entry to one configuration and prevents rotation about its axis. The cartridge is inserted along the line of arrow 1000 and will partially conform to the key shaped area of the receivor and be shaped. The inserted cartridge will have portions in contact with the receivor wall and portions will be separated by an air gap. One or more heating elements are shown. Said heating elements may be a series of vertical heating elements 70 (also referred to as an array). Said elements may be one or more heating elements which wrap at least partially around the receivor (also referred to as outer boundary located between the cartridge and heating elements). Said heating vertical elements are each aligned with a specific region of the heating chamber in an axial direction. In some instances the heater 20 is one or more heating elements encircle at least a part of the receivor (also referred to as outer boundary located between the cartridge and heating elements) and/or heating chamber. The vertical heaters are not a limitations and as disclosed herein heating element(s) at least partially encircling a receivor are within the scope of the disclosure. FIG. 8C is an alternate embodiment without a key guide portion of the aspects of a vertical zone heater 72 showing elements which are aligned with a cartridge 1 and how each element 73-77 forms a corresponding vertical heat zone E-I. An optional boundary 78 (receivor) may be formed between the heater elements 73-77 and the cartridge 1. Accordingly, vertical heat zone "E" is heated by vertical zone heater element 73 and so on. A printed circuit board (PCB) or other support may be used to support the heater elements 73-77. FIG. 8D shows a side view of the cartridge 1 in FIG. 8C with a representation of location of vertical heat zones E-G with a support 79.

The controller supplies power to each one or more heater element in response to temperature sensor data. In some instances the heating may be sequential the turning on/off of a heating element is controlled by the controller. The controller can also receive temperature sensor data to turn one or more heating elements or to maintain a set exposure temperature. The controller can turn on one of the heating elements thereby directing the heat to one heating zone. Memory either volatile or non-volatile will store data on system parameters when the controller is not powered. The controller instructs the on/off of heating elements within the heating array.

Figure 9B:
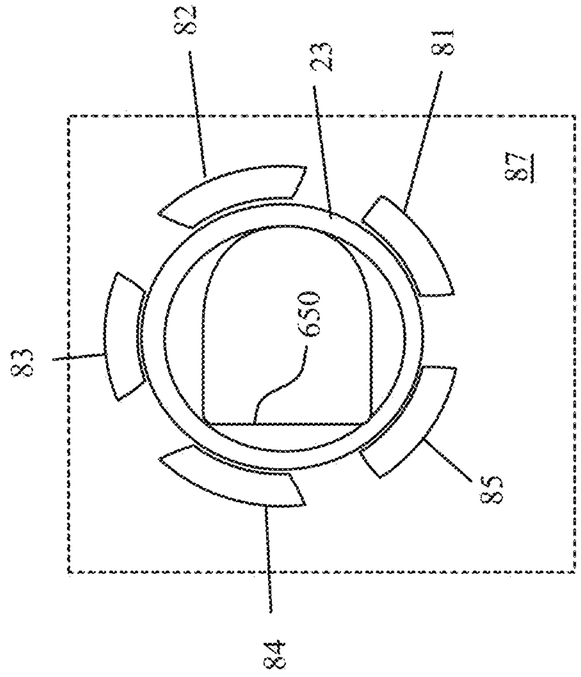
FIGS. 9A and 9B are illustrations of another keyed exemplar for heating a consumable.
Figure 9A:
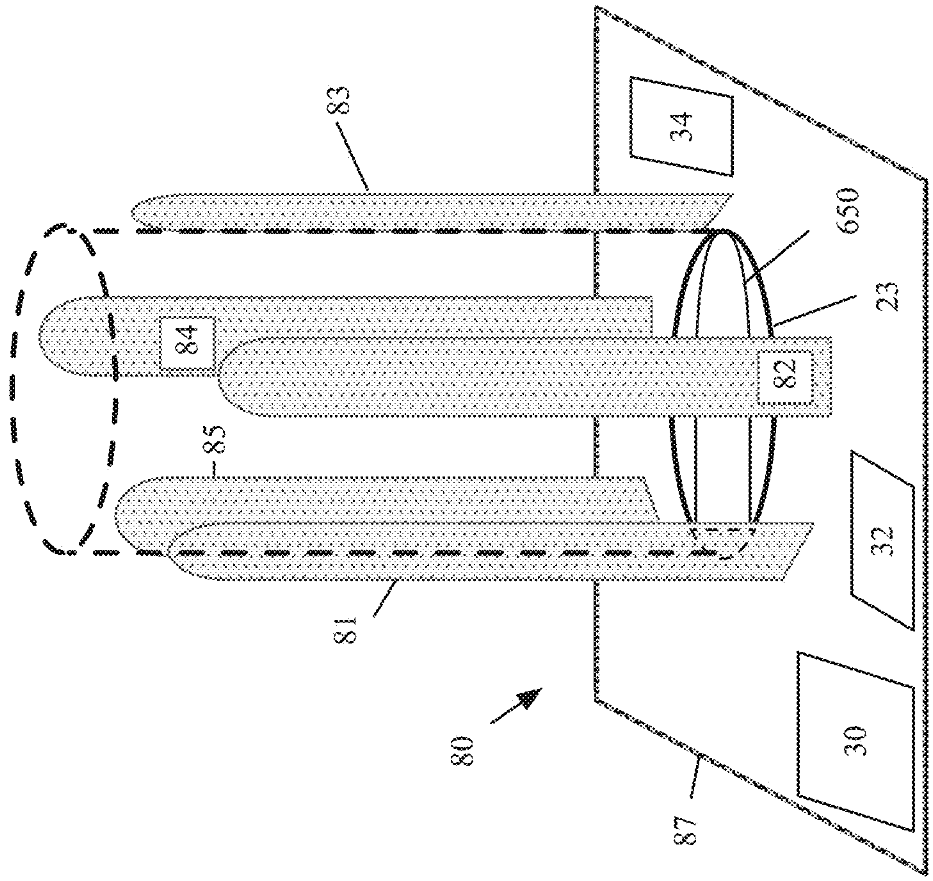

FIG. 9A is another exemplary of a vertical heating zone device 80 with heating elements 81-85 affixed to a PCB board or other support 87. A PCB can also support a controller 30 and memory 32 and a temperature sensor 34. Another cartridge orientation key hole 650 is also shown. An optional boundary 78 (also referred to as a receivor) may be formed between the heater elements and the cartridge. FIG. 9B illustrates a top view of the key hole, receivor and heater(s) arrangement of FIG. 9A.

Figure 10:
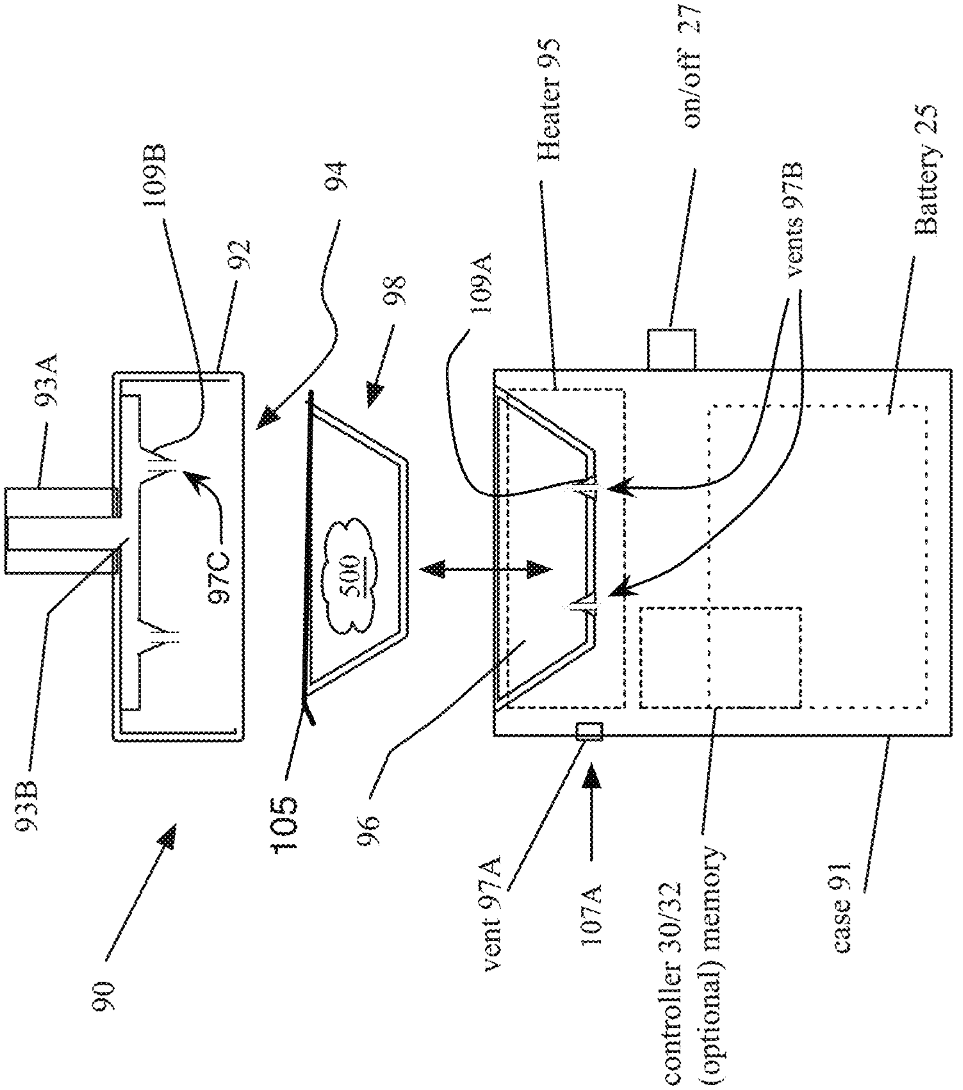
FIGS. 10-12 illustrate aspects of a disposable drop-in cartridge module and heater.
Figure 11:
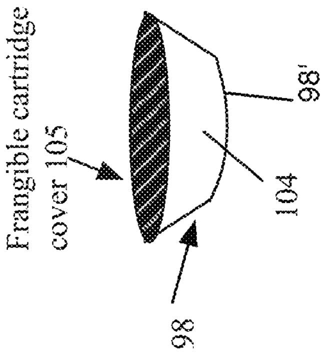
Figure 12:
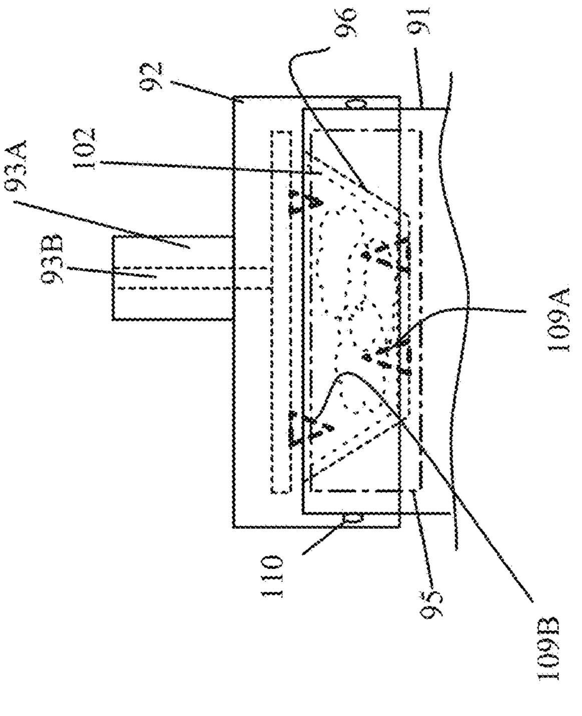

FIGS. 10-13 show cup cartridges in a heater systems. one disposable cup cartridge heating and vaporizing system 90 is shown in FIGS. 10-12. A case 91 and a cover 92 form the heating device. Not shown are the memory, battery and electrical connections. Through the cover and is an intake 93A and through the intake is a fluid pathway 93B which communicates to the inside of the device. The cover fits onto the case forming a closed unit with the fluid pathway in and out of the device. The cover 92 has an open bottom 94 to mate with the case 91. Within the case is a heater 95 a heater chamber 96 of a predefined shape and a vent 97A opening through which is a fluid pathway 107A from the exterior of the case 91 to the interior. Vents 97B are provide a fluid pathway through bottom of the chamber to the bottom 98' of the cup cartridge from cutting elements 109A into the cartridge and communicate from the interior of the case into the cartridge. The cover can have top cutting elements 109B which are shown with vents 97C formed therein and which puncture a frangible top 105 of the cup cartridge. The cutting elements are optional because the user may remove the frangible cover and in such cases a cover 92 does not need to have cutting elements 97B. The cup cartridge 98 is of a size and shape to fit within the heater chamber 96 and is shown containing organic material 500. In some instance the cartridge 98 may have one or more of a heat transfer body 104 to facilitate heat transfer and a frangible cover 105 to seal a prefilled cartridge.

FIG. 11 shows an inserted frangible cartridge and FIG. 12 shows the inserted cartridge. The method of use includes puncturing the cartridge into at least the cutting element 109A and optionally 109B. In the post puncture position after a cartridge has been inserted into the device and the cover 92 attached. The frangible cover 105 of the cartridge 98 is punctured to allow vapor to flow into the fluid pathway 93B. The cover 92 may have seals 110 to form a better closure between cover and case. In some instance the cartridge 98 will be scarred by the heating process. A scarred cartridge which may be more frangible post heat scarring discourages reuse of non-reusable cartridges. Paper, fibers such as cotton and hemp, metal, foil, plastic, resins, thermo plastics, ceramics, ceramic doped paper, glass, and combination thereof may be suitable material for some or all of the cartridge. The cartridge maybe made of different materials in different regions.

Figure 13:
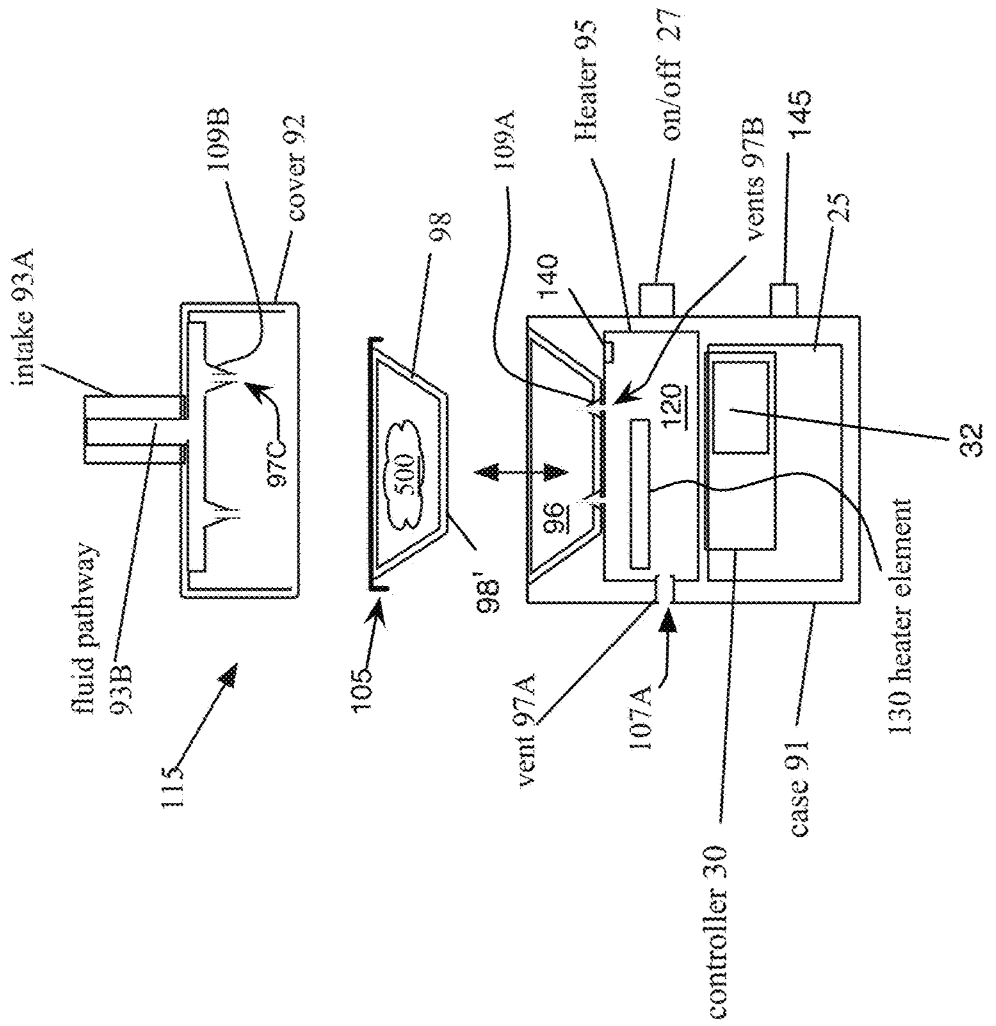
FIG. 13 illustrates aspects of a disposable drop-in cartridge module and heater.

FIG. 13 shows a convection heater in a cartridge vaporizer system 115 utilizing the basic components of the system illustrated in FIGS. 10-12 but using a convection manifold as the heating engine to supply heat the material. Main elements of the heater 95 are a manifold 120 a heating element 130 and a thermistor 140 in signal communication with the controller 30 which may include memory 32. Not shown are the electrical connections, which are known in the art. The heater heats air which has been drawn in from the outside of the case through the vent 97A. The thermistor (or other temperature sensor) 34 is used by the controller 30 to determine the temperature of the air heated in the manifold 120. A communication light 145 such as LED (light emitting diode) also in signal communication with the controller 30 at least one of changes color, lights up, flashes and goes steady state when the temperature in the manifold is adequate to vaporize the material 500 (or extract). The user then inhales on the intake 93A and heater air in the manifold exits the manifold through the vents 97B contacting the material 500 and forming vapor which is drawn out of the cartridge 98 through the third vents 97C. Within the is the heater chamber 96 of a predefined shape and vent 97A opening through which is formed a fluid pathway 107A from the exterior of the case 91 to the interior. Vents 97B provide a fluid pathway through the bottom cutting elements 109A into the bottom 98' of the cup cartridge and communicate from the interior of the case into the cartridge. The cover can have top cutting elements 109B which are shown with vents 97C formed therein and which puncture a frangible top 105 of the cup cartridge. The cutting elements are optional because the user may remove the frangible cover and in such cases a cover 92 does not need to have cutting elements 97B.

Figure 14B:
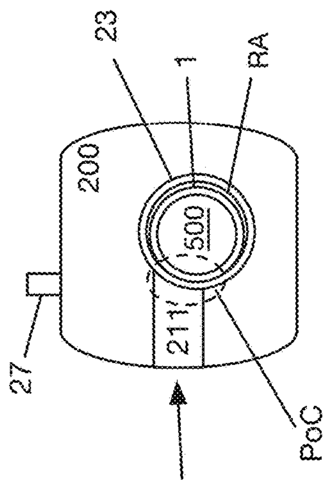
FIGS. 14A-14C illustrate aspects of a cartridge module and heater.
Figure 14C:
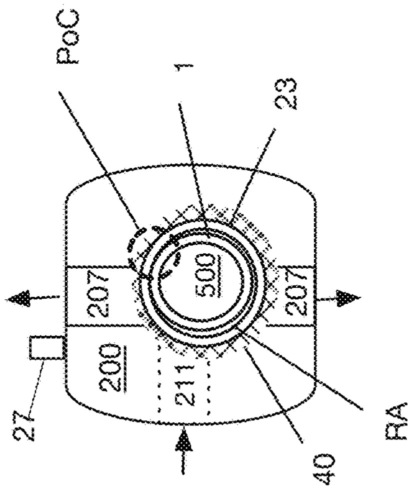
Figure 14A:
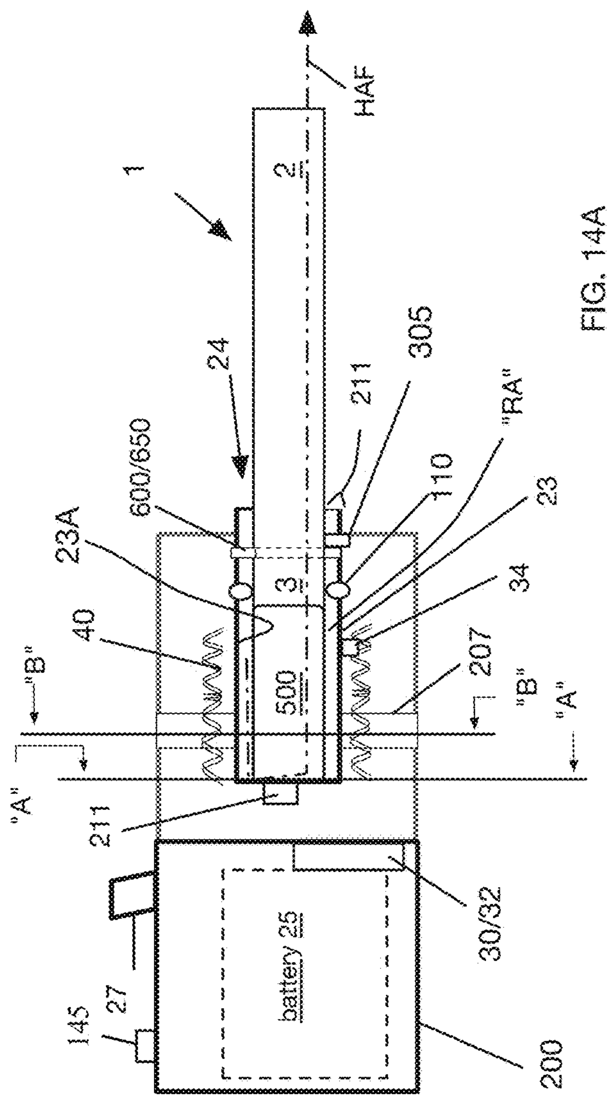

FIGS. 14A-14C show a non-pass through cartridge heating system, the cartridge has an elongated generally cylindrical body with a distal end 3 which is kept in the receivor by the receivor. The cartridge may be formed of a disposable material which will not burn or release toxic or harmful fumes at temperatures that are reached by the heater in the device. In generally for many organic materials the temperature of vaporization will be between 320 F to over 420 F. At least a portion of the cartridge may be one of squeezed, indented or shaped upon insertion into the receivor and/or key hole or key guide portion. The cartridge may be scarred by the heating process as it is disposable. Paper, fibers such as cotton and hemp, metal, foil, plastic, resins, thermo plastics, wool, ceramics, ceramic doped paper, glass, PEEK, and combination thereof may be suitable material for some or all of the cartridge. The cartridge maybe made of different materials for different regions. For example the containment portion 3 is subjected to the greatest heat. The material must be suitable to transfer a sufficient portion of the heat applied to its surface through its wall and into the containment portion to thereby cause vapor of the organic material 500.

A case 200 contains the one or more heating elements 40. Heating elements include a coil wire, Kapton™ (polyamide) or silicone tape with metalized flat elements, iron-chromium-aluminum (FeCrAl) alloys, nichrome (nickel chrome alloy) wires, filaments or any material which does not outgas at the desired temperatures, are located around the outside annular wall of the receivor 23 (heating chamber). The cartridge fits into the case 200 via a cartridge interface 24 which is, part of and/or fluidly connected to the receivor 23. Said receivor is both a guide for accepting a cartridge and heating chamber. Upon insertion of the containment end 3 (which is also referred to as distal end) of the cartridge into the heating chamber (also referred to as a receivor) 23. Said receivor is configured to be in thermal communication with heat element(s) surrounding at least part of the receivor. Said thermal communication refers to the transfer of heat provided by one or more heating elements through the heating chamber wall. The cartridge 1 is removable from the case. The inhalation end 2 (also referred to as the proximal end) is extended from the case. The receivor 23 may have seals 110 to form a better closure between receivor and cartridge. An organic plant material 500 for vaporization is within the distal end near the one or more heating elements 40. A positional sensor 305 can provide input to the controller to decision if a cartridge is in the receivor. Said controller uses such data to control the timing and amount of power provided to the one or more heating elements.

During use, the cartridge is inserted into the receivor via the cartridge interface 24 and passes through a key guide 600 or key hole 650 which restricts the cartridges rotation about its axis. In some instance the insertion will indent, squeeze or shape a portion of the cartridge. A user presses the on/off switch which may activate a communication light such as LED in signal communication with the controller 30 which will at least one of change LED color, light up LED, flashes LED and steady state LED to communicate when the temperature is adequate to vaporize the material 500 (or extract). In some instances the controller communicates to the user visual or audio feedback to the user via status indicators 712 such as led lights, haptic or vibration device (known in the art including but not limited to motors, piezo and other solid state items), or other chirps like sounds from a microprocessor.

A volume of air in the receivor "RA" is heated between the inner wall 23A and at least the cartridge when heating element(s) heat the inner wall 23A of the receivor and the cartridge inside the receivor. The volume of heated air will flow during inhalation on the inhalation end forming a convection air flow also referred to as a Heated Airflow "HAF" which is drawn from the distal end of the consumable cartridge distal end (containment) 3 to and through the proximal end 2. One or more vents 207 allow the heater to vent from the case. At least one air intake 211 provides a fluid pathway for additional air to enter the case and be drawn through the cartridge from distal end to proximal end and then out for inhalation. The sections of the cartridge containment end in physical contact with the inner wall 23A are points of contact "PoC" in thermal contact with the receivor heated by conduction. FIG. 7B shows a cut away view of the device along the line of A-A and FIG. 7C shows a cut-away of the device along the lines of "B-B".

Figure 14D:
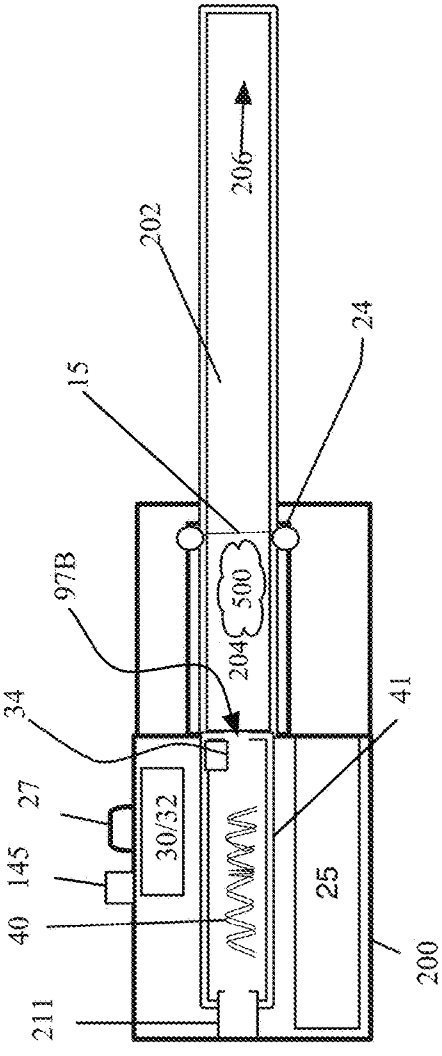
FIG. 14D illustrate aspects of a heater with manifold and a disposable cartridge.

FIG. 14D shows a non-pass through cartridge heating system, device and method. The case 200 contains the convection heater manifold 41 forming a fluid pathway from the air intake 211 to the distal end 204 of the cartridge. The cartridge fits into an interface 203 in the case whereby the distal end 204 of the cartridge (the air intake end "AIE") which contains material 500 to be vaporized is placed in proximity to the heater manifold 41. A divider 15 is formed between the distal end and proximal end. An organic material 500 for vaporization is within the distal end near the manifold 41 outlet vents 97B. The proximal end 206 is an inhalation end ("IE") and is extended from the case. The manifold contains one or more heating elements 40. Heating elements may be coil wire, filament, metalized film, metalized silicon, or any suitable resistance material for electrical heating. The cartridge 202 is removable from the case. The cartridge fits into interface 203 whereby the distal end 204 of the cartridge is within the case and the proximal end 206 is extended from the case. The controller 30 receives input from one or more of temperature sensor 34 and controls the power from the battery to the heater to maintain SET of air in the manifold for optimal vaporization. Organic material 500 for vaporization is within the distal to receive heated air from the manifold. In use, an air intake 211 provides a fluid pathway for air to enter the manifold 41 and is then drawn through the vents 97B out of the manifold into the distal end to proximal end and then out for inhalation. A user presses the on/off switch which may activate a communication light 145 such as LED in signal communication with the controller 30 which will at least one of change LED color, light up LED, flashes LED and steady state LED to communicate when the temperature in the manifold is adequate to vaporize the material 500 (or extract).

Figure 15A:
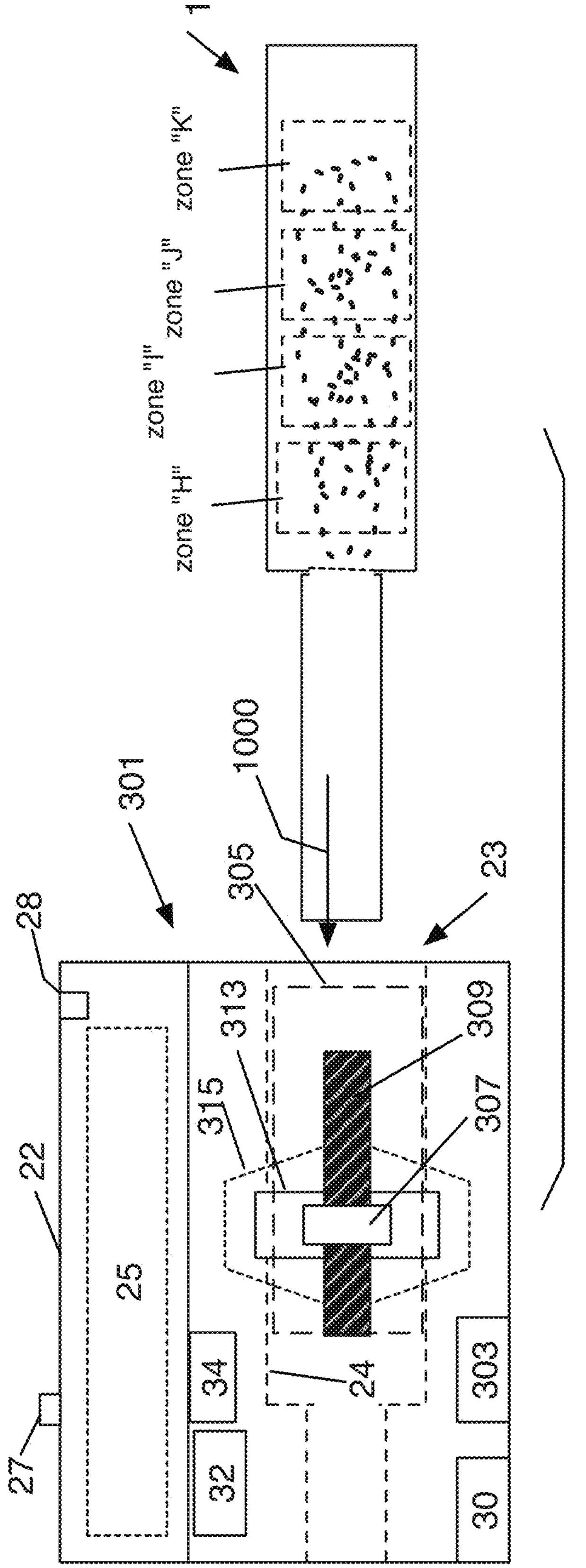
FIGS. 15A-15C illustrate a linear moving zone heating system and method.
Figure 15C:
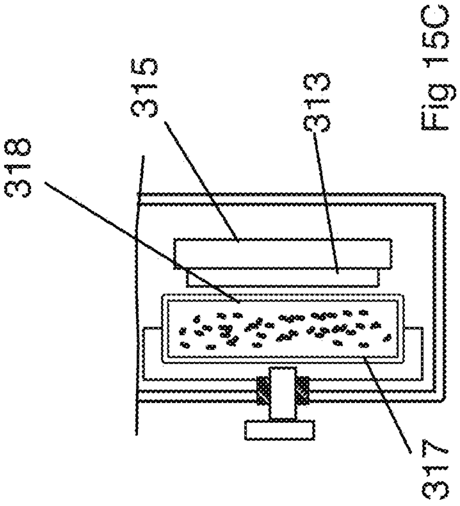
Figure 15B:
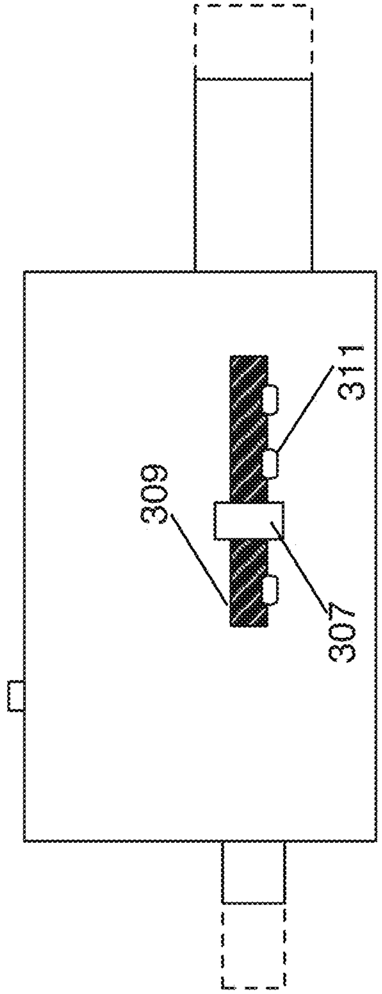
Figures 15D, 15E, 15F, 15G:
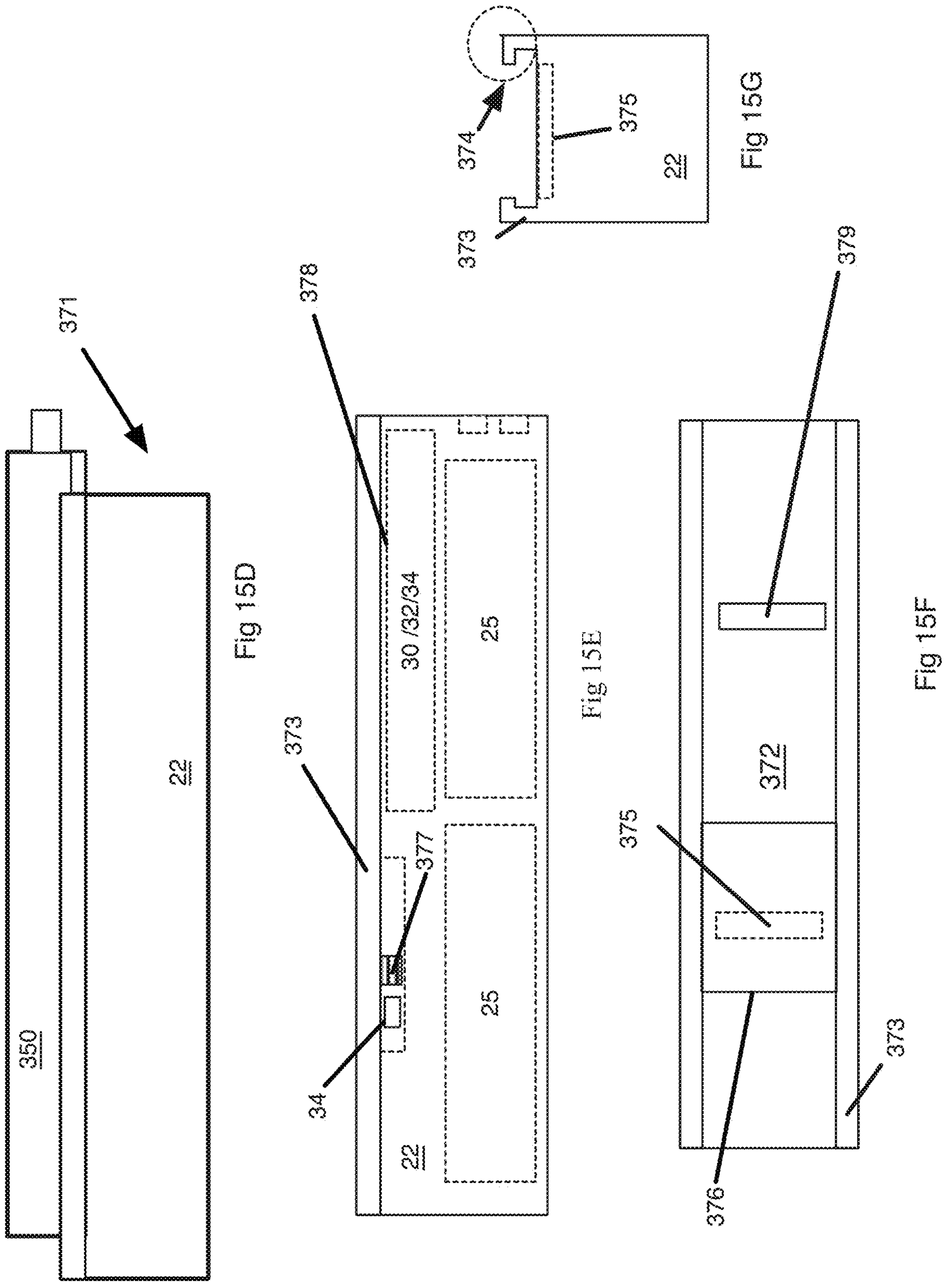
FIG. 15D shows a side view of a vaporizer system with sliding cartridge.
FIGS. 15E-15G show a side, top and back view of the base of the vaporizer. Shown in FIG. 15D.

FIGS. 15A-16M show a heater system and device 340 wherein a heater encasement has a receiver 23 which allows insertion of a cartridge 1. FIGS. 15A-15C show aspect of a sled moving system with a single heater. The cartridge shown outlines 4 cartridge zones "H-K" for heating, the zones correspond to the approximate size of the area heat is being applied to from the device. A battery 25 supplies power on demand. Controller 30, memory 32 and temperature sensor 34 are also shown. The heater system 301 which has a single region which is the outlet for heat and it is of a size that corresponds roughly to the size of one cartridge zone which is fixed. One or more vents 303 may be provided. The flat cartridge shown may be advantageous in that it has a greater surface area facing the heating element than a cylindrical cartridge and will heat the material or extract therein in accordance with the heat transfer over the flat area. In this instance a sled 305 within the case reversibly mates with a cartridge 1. The sled 305 is connected to a lever 307 which extend outside of the case and moves within a fixed track 309. A series of tabs 311 may be formed in the track to provide tactile feedback to a user, through the lever, as the lever passes along the track and encounters a tab. The tabs approximate cartridge position in the device. The lever 307 is used to move a cartridge mated with a sled forward or back in a line within the case. The movement is used to align different portions of the cartridge with the single zone heating element 313 and insulation layer 315 is between the heating element and case. The back wall 317 of the cartridge is shaped to fit in the sled 305. That wall may be textured, or have magnetic or metal portions thereon to facilitate a good fit. The front wall 318 of the cartridge may be a dissimilar material than other portions of the cartridge. The front wall may be mesh or vented or textured. The front wall may be constructed of a material or with surface features to at least one of promote, reduce or control heat transfer.

In this exemplary, or any of the cartridge exemplary at least a portion of the cartridge may have a temperature sensitive dye or material therein which changes color once the cartridge has been used to alert the user (or a sensor) that it is a used cartridge. The cartridge mates with the cartridge guide which places it adjacent to heating elements.

It should be constructed so that it does not burn, or combust at the selected exposure temperatures (SET). SET is selected from the group consisting of about 380 degrees F., 390 degrees F., 400 degrees F., 410 degrees F., 420 degrees F., 430 degrees F., and 440 degrees F. In some instance the failure to burn or combust at the SET is for a one minute exposure. In some instances that failure to burn or combust at the SET is for at least a two minute exposure. In some instances that failure to burn or combust at the SET is for at least a three minute exposure.

It is preferred that the failure to burn or combust at the SET is for after at least two, one minute exposures. It is more preferred that the failure to burn or combust at the SET is for at least three, one minute exposures. It is still more preferred that the failure to burn or combust at the SET is for at least five, one minute exposures. It is yet more preferred that the failure to burn or combust at the SET is for at least six, one minute exposures. It is most preferred that the failure to burn or combust at the SET is for at least eight, one minute exposure.

FIGS. 15D-15M show a system and components supporting a method of heating another linearly moving reusable cartridge. Although the cartridge is shown as refillable, those of ordinary skill in the art will recognize that a disposable cartridge is within the scope of the disclosure and replacing the reusable cartridge with a disposable cartridge or nesting a secondary disposable container in the area of the heating chamber for the reusable cartridge is within the scope of this disclosure.

The device 371 includes a base 22 having a receptacle 372 to receive a carriage 350 with a material chamber. The base also may include carriage guides 373 to position an insertable cartridge. A catch 374 may also be provided. Catch(es) may be combined with a guide to position a sliding cartridge and to limit its removal to certain orientations. A heater region 375 is provided in the receptacle. The heater region 375 is surrounded by one or more of a buffering region 376 of ceramic, steel, glass, aluminum, composite or the like to both allow for a conduction heating element 377 to provide heat through a heater region 375 which is a plate or tile that heats up and via primarily conduction to heat transfer to plant material, extract or a cartridge in close proximity to its surface. Heaters may be conductive plates with filament, coil or metalized resistance heaters thereon or ceramic tiles with resistance wires therein. A contact strip 379 may be added to connect with contacts to activate positioning lights or vibration or other alarm. Indicator light 325 which may be colored LEDs or the like (such as green and red) can be lit by the controller to indicate (communicate to user) status of positioning. Two lights shown is not a limitation and more than two may be used. Red may mean out of power. Green may mean go. Yellow may mean spent cartridge. The communication may be of a spent cartridge, a spent zone that has been heated, the remaining zones to heat, a need for recharge, or remaining zones to heat.

The heating element 377 in preferred to have a total resistance of about 1 to about 8 Ohms, and more preferred to have a total resistance of about 2 to about 6 Ohms and most and more preferred to have a total resistance of about 3 to about 5 Ohms. Of course the selection and size of heater region material and buffer region material may change the preferred Ohms. Materials with higher thermal conductivity W/m·° K (BTU·in/ft$^2$·hr·° F.) may require less energy to heat the heater region to the predetermined temperature.

A circuit board which connect the battery power supply to the heating element 377 also contains a microprocessor controller 30 which has memory 32 and which controls certain operations of the vaporizer device. One or more temperature sensors 34 may also be included. Operations controlled may include one or more of time, date, location, security code, on/off, sequence of heating, temperature, indicator display of the heater, battery charging, battery management, GPS, wireless communications, WIFI or Bluetooth communications, battery state of charge indication, cartridge verification, wireless or wired input/output. Those of ordinary skill in the art will recognize that Bluetooth or other wireless or wired connection to a smart phone or computer may also be used to perform some of the controller functions and that would be within the scope of this disclosure. The battery supply 25 is used to power the device. The controller 30 controls the flow of power to the heating element and may use PWM or other schema to maintain the temperature of the heating element at a predefined temperature. A PCB board is within the base and contain microprocessors, memory, controllers, is connected to sensors, connections to on/off switches, connections to I/O, connection to battery supply and the like. Not shown are the electrical connections between the electrically powered components and between the controller and electrical components which are well known in the art.

Figures 15H, 15I, 15J, 15K:
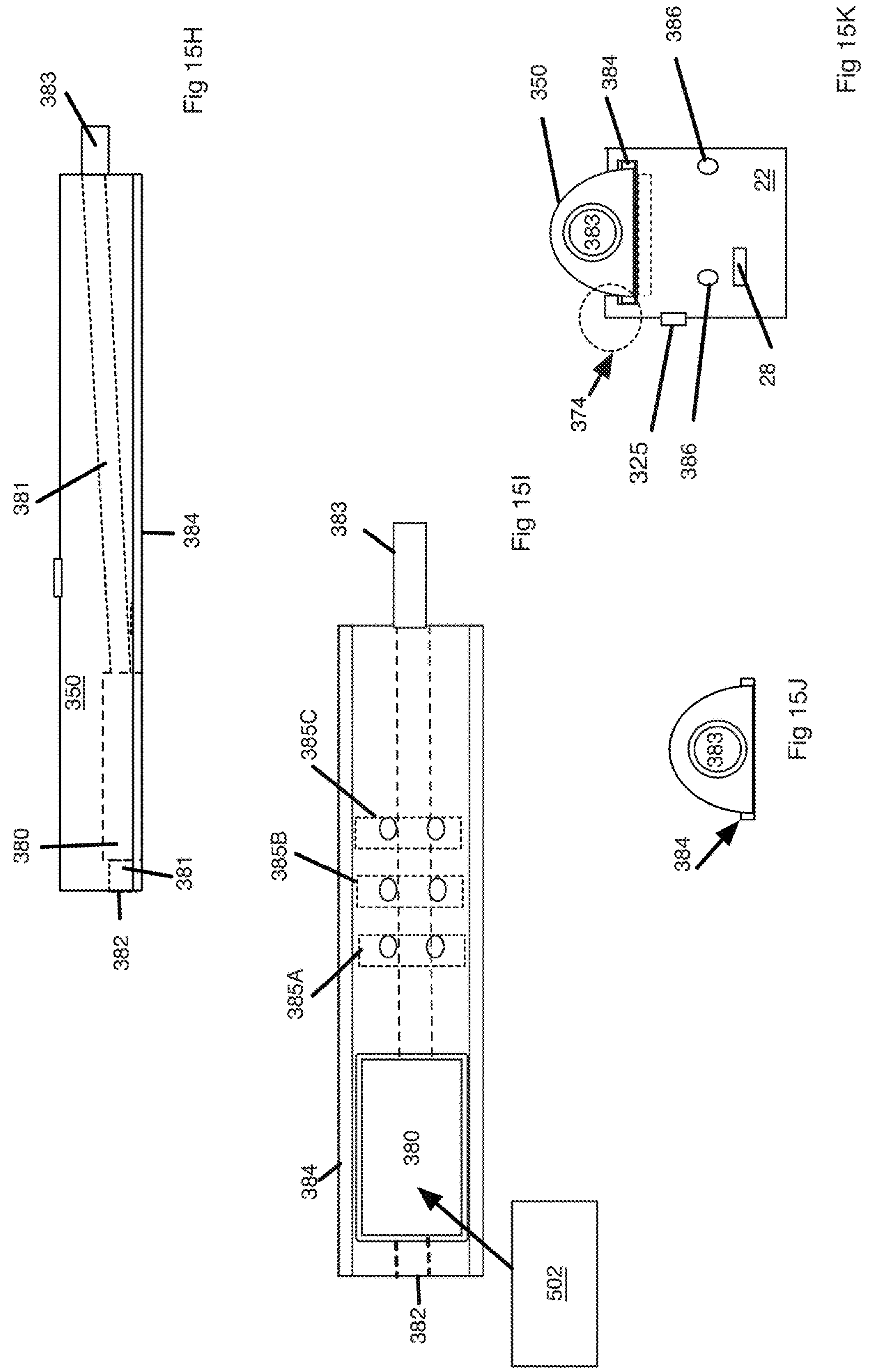
FIGS. 15H-15J show a side, bottom and back view of the sliding cartridge of FIG. 15D.
FIG. 15K shows a back view of a sliding cartridge of FIG. 15D.

FIGS. 15H-15J show aspects of the cartridge 350. This carriage has a chamber 380 which is in the midst of a fluid pathway 381 which passes through the chamber 380. The chamber is open on one side with fluid connections (not shown) and is constructed of a material which can withstand heating by the heater region 375. The fluid pathway has an intake opening 382 a long pathway 381 which passes through the fluid connection in the chamber and an inhalation opening 383. The carriage catches 384 mate with carriage catches 374 to limit the carriages movement in the receptacle. A series of pairs of contacts (385A-385C) may be added which are activated via the contact strip 379. By positioning a contact pair in electrical contact with a contact strip a light, or other visual or auditory indicator of a predetermined position may be activated. The contacts help a user positioning the chamber 380 at predetermined intervals along the chamber 380. In some instance a disposable cartridge 502 containing material or extract or both is fitted into the chamber 350 and disposed of after use.

For a non-electrical feedback mechanism on position, the contact strip may be replaced by a bump or divot and the contacts may be replaced by pups or divots which that a tactile response can be generated when a pair of contacts pas over a contact strip.

Figure 15L:
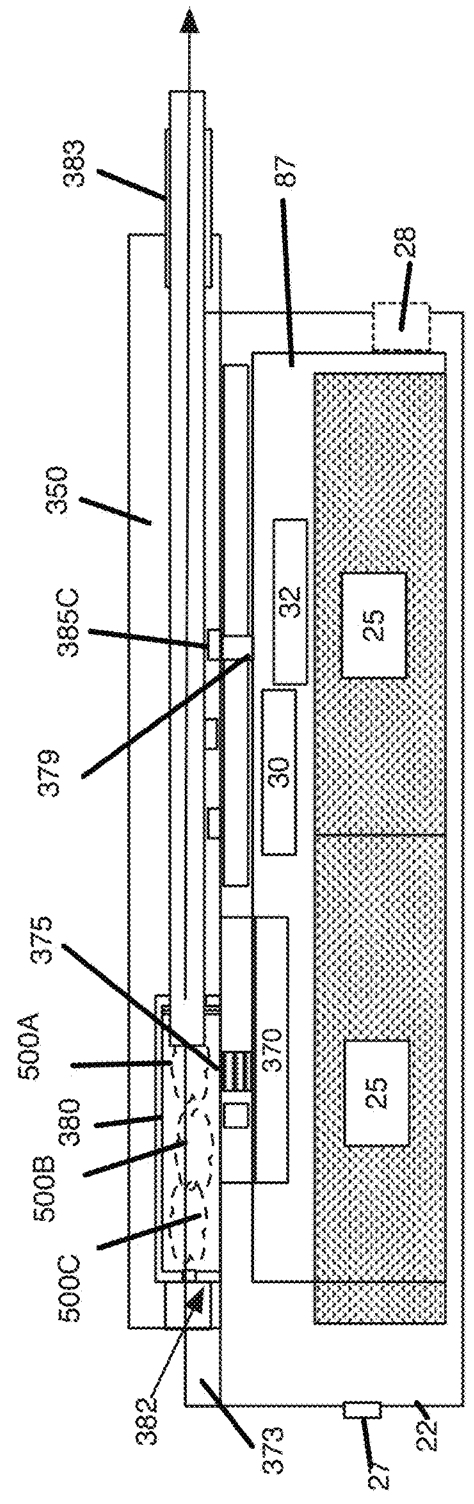
FIGS. 15L-15M illustrate sequenced zone heating of the cartridge in FIG. 15D.
Figure 15M:
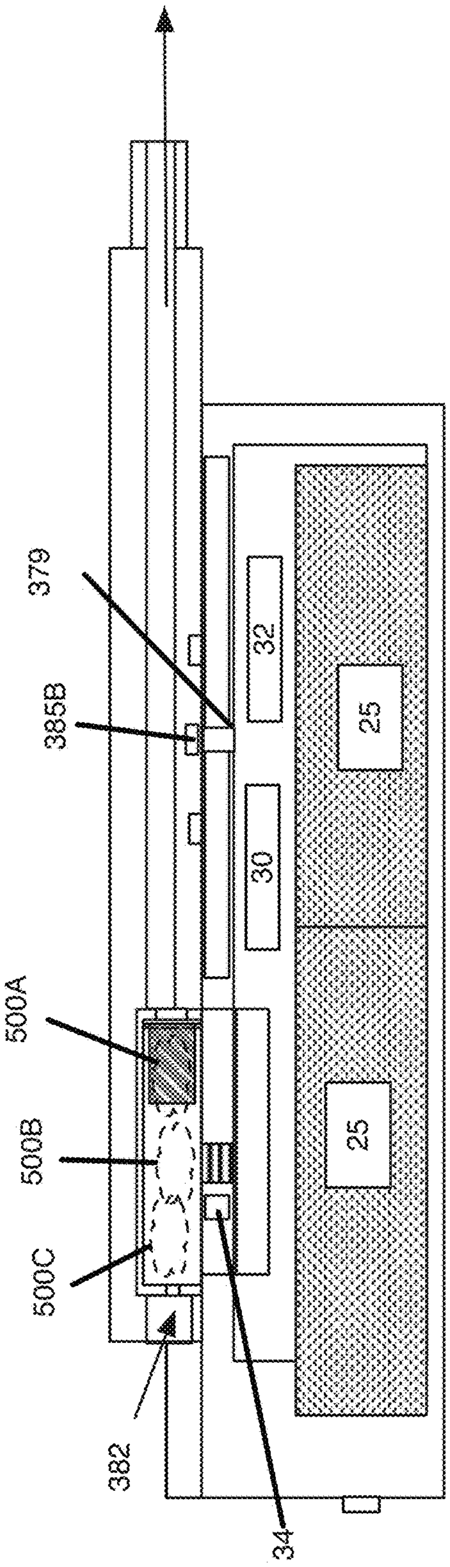

An assembled device shown in FIGS. 15K-15M has a carriage 350 mated to a base 22. An input output 28 through the base is shown and indicator lights 386 are visible. Such lights can convey (communicate) to the user including but not limited to state of charge, temperature, ready state, position of carriage and the like.

The chamber 380 is larger than the heating element 375 and wherein the heat from the heating element 377 transmitted through the heater region 375 has direct thermal contact with a portion of the material in the chamber. The movement of the carriage, associated chamber and material therein is done be relocating the carriage relative to the heater region 375. The movement of the chamber relative to the heater region is used to move a new region of material (in the chamber) into direct thermal contact with the heater region. Movement in this instance is along the receptacle and the figures illustrate positioning plant material portions 500A-500C, which a user places in the chamber, over the heater element 375. Those of ordinary skill in the art will recognize that the movement of portions of the material in the chamber may be accomplished by rotating a circular chamber wherein a heater region is a pie shaped swede that only heats a portion of the material in the circular chamber is within the scope of this disclosure as it is moving material in a chamber sub portion at a time into direct thermal contact a portion at a time and such a rotational movement is also within the scope of this disclosure.

The sequence of use is such that a user slides the carriage to a position whereby material 500A is positioned over the heater element 375. As the heater element heats and vaporizes organic material from the material the user inhales on the inhalation opening thereby causing air to move through the fluid pathway 381 and draw with it the vapor. After a portion of material 500A has been heated the user moves the carriage forward and material portion 500B is placed over the heater element and the sequence repeats until the material has been utilized.

Memory can keep track of the movement of the carriage (which contacts have been closed) and prevent heating of a region previously heated. To reduce heating (with hot vapor) unused material the air pathway passes over the unheated portion(s) of material 500B and 500C then over the heated portion 500A, otherwise hot vapors will heat the material in the portions which are placed remote from the heater element.

The contact strip 379 is shown during the sequence of use in FIGS. 15L and 15M first contacting contact pair 385C provides indication that the chamber is positioned properly, then pair 385B provides indication that the linear movement of the chamber forward is successful to place material in the right proximity to the heater.

FIGS. 16 and 17 shows a two part cartridge 400. The cover is a generally tubular form with an annular wall 402 and open ends 403. A fluid passage 404 is formed inside. Preferable the cover is generally trapezoidal, rectangular or ovoid whereby it has a floor "F" which is longer than the side region "S". A carrier 406 is of a size and shape to slide into and nest tightly into the cover 401. The carrier is an open structure with sidewalls 407, a floor 408 which is shown divided into a first sections 410A and a second section 410B and one or more dividers 412. Dividers may be added to reduce the opportunity for plant material or concentrate to become disengaged from the carrier. The dividers are permeable to air flow. The first section 410A is an inhalation fluid pathway with an inhalation end "IE". The second section 410B is a material containment chamber to hold and expose plant material or extract to heat with an air intake end "AIE". They may be mesh, slotted, perforated or have vents whereby air inhaled can pass through the cartridge 400.

The cartridge portion for containment will be heated to vaporize. It should be constructed so that it does not burn, or combust at the selected exposure temperatures (SET). SET is selected from the group consisting of about 380 degrees F., 390 degrees F., 400 degrees F., 410 degrees F., 420 degrees F., 430 degrees F., and 440 degrees F. In some instance the failure to burn or combust at the SET is for a one minute exposure. In some instances that failure to burn or combust at the SET is for at least a two minute exposure. In some instances that failure to burn or combust at the SET is for at least a three minute exposure.

It is preferred that he failure to burn or combust at the SET is for after at least two, one minute exposures. It is more preferred that the failure to burn or combust at the SET is for at least three, one minute exposures. It is still more preferred that the failure to burn or combust at the SET is for at least five, one minute exposures. It is yet more preferred that the failure to burn or combust at the SET is for at least six, one minute exposures. It is most preferred that the failure to burn or combust at the SET is for at least eight, one minute exposure.

FIG. 18 shows an example of an optional marked version of the exterior of the cartridge. The markings 416 are visual cues. They may also be indentations and be tactile cues and are used for positioning and moving a cartridge in a heater. FIG. 19A is a cutaway view of FIG. 18 along the line of "A-A". FIG. 19B is a cut-away view of FIG. 18 along the line of "B-B".

FIG. 20 is an alternate configuration which adds an alignment key 420 to help align top and bottom areas of a cartridge. The top area has one less wall between it and the heaters. In some instance a cartridge may be aligned with the double walled bottom nearest the heater zone or ones. In other instance the single walled top of the cartridge may be closest to the heater zone or zones. The alignment key mates with a receiver wherein the cartridge is positioned in a predetermined orientation.

FIGS. 21A-21C show alternate cartridge covering exemplars. A partial cover 425 is shown which fits over the open top of the carrier 426. An insert cover 427 is shown which fits inside the interior side walls of the carrier. Foil, laminate, paper, fabric, plastic and Mylar are suitable materials. The cover may also extend beyond the edges of the carrier 426 as a flexible cover 428 is shown sealed to the top of the carrier. Sealing may be via heat weld or adhesives.

FIGS. 22A-22B show aspects of a tubular two part cartridge 430. At least part of which is disposable. The first section 410A has an asymmetrical wall 432 which and open top 433 an interior annular wall 434 a larger internal diameter receiver end 435 and a vapor/air permeable divider 412 to prohibit material from easily passing into the interior above the divider. A second section 410B is also tubular. It has an air intake end 436 and a receiver mating end 437 which fits snugly into the receiver 435. Material (or extract)

500 is placed into the interior 438 of the second section. A divider 412 keeps the material from easily falling out of the cartridge. The sections may be made of dissimilar materials. The second section 410B may be designed for thermal transfer and to withstand an exterior temperature of up to 420 degrees F. for a preselected period of time. The first section 410A may be constructed to have greater insulation or tactility than the first section. The first section may be constructed of lower melting or burning point materials such as plastics. The second section may be constricted of paper, wool, blends, fabric, hemp, ceramic, metal, high temperature plastic and/or combinations thereof.

Optionally a cover 439 is fitted over the air intake end. A second or alternate cover (not shown) may also be fit over the open top. For pre-packaged cartridges snug covers can be used to one or more of limit or reduce oxidation, prevent smell, provide security and otherwise preserve the material. The cover may be pressure fit, screw fit, glued, sonic welded. The cover may be frangible.

FIGS. 23A-23G show a heater base for use with disposable (or refillable) cartridges and the use of that system. The heater base has the advantage of keeping very clean. The cartridge mates with the base but all flow of vapor s within the heated cartridge thereby keeping the heater clean and without vapor residue. When a cartridge is used it is disposed of.

The heater 440 has a case 442 with a cartridge interface 444 therethrough. Optional key guides 445 for a cartridge with alignment keys 420 are illustrated but they are optional. An on/off switch 446 is shown and an illuminated indicator 447. A battery 25 is inside the case, as is a controller 30, optional I/O optional memory 32, and optional wireless connection via WIFI or Bluetooth or the like 33. A recharge connection 448 communicates through the case for recharging the battery. A cartridge sensor 449 may be added within a cartridge interface 444. a thermistor 140 in signal communication with the controller 30 The sensor interrupts power to the one or more heater elements 40 if a cartridge is not present in the interface.

Figure 23G:
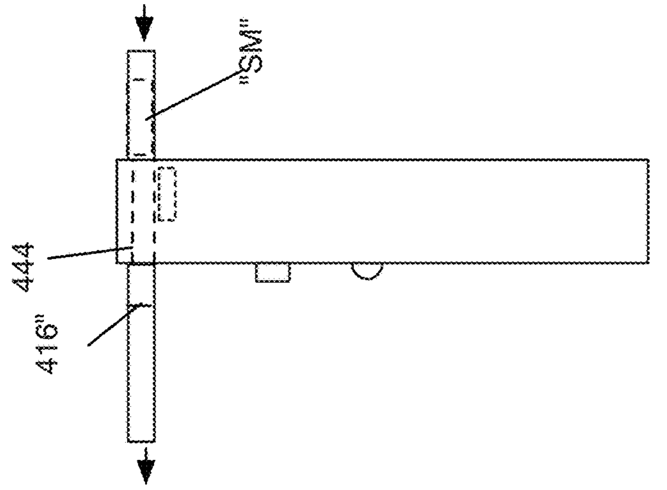
Figure 23F:
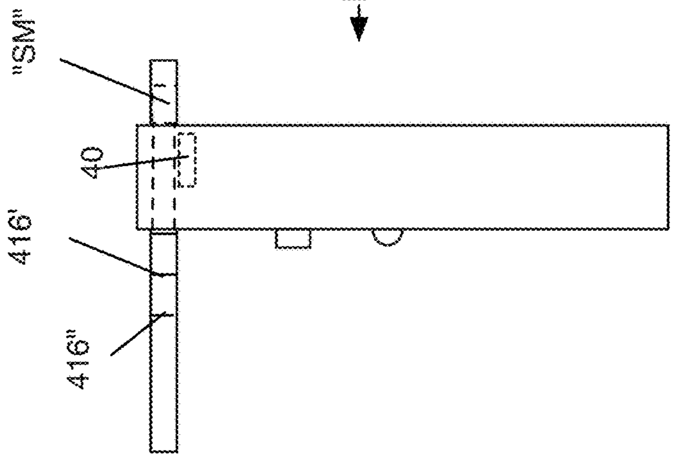
Figure 23E:
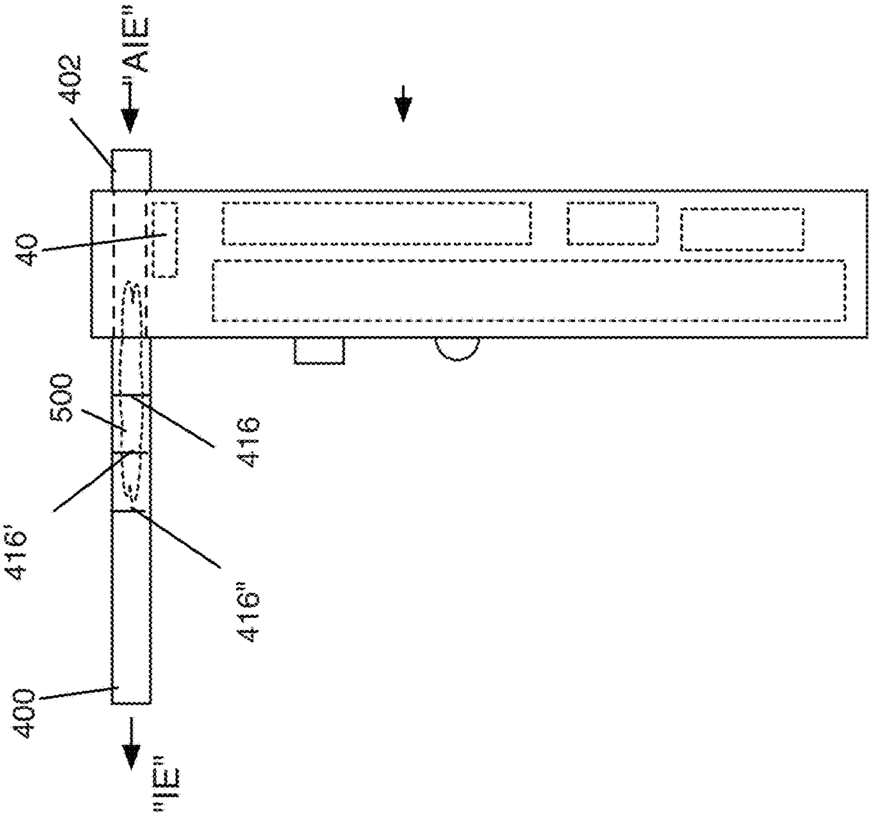

FIGS. 23C and 23D show a heater 440 with a cartridge 400. The cartridge fits into the interface 450. The front side 442' of the heater unit is shown with a cartridge 400 inserted therefrom in to the interface 450. During use the cartridge can be moved, via pushing it from the front side 442' of the heater towards the backside 442". FIGS. 23E-23G show the use of a cartridge in the heater unit in a sequence of use. The inhalation end "IE" is where a user inhales and airflow enters the cartridge through the air intake end "AIE". Optional visual cues 416-416" on the cartridge cover can be used to approximate the movement of cartridge portions over heater 40 element(s). Positional tabs 417 may also be provided whereby an inserted cartridge activates a sensor or actuator to identify the presence of a cartridge and/or the position of the cartridge or movement of the cartridge in a receiver. As the cartridge is pushed through the area of spent material "SM" within the cartridge increases in amount until the cartridge is finished and then disposed of. In some instance a user may reuse a cartridge if it is constricted of material suitable for multiple uses.

FIGS. 24 and 25 show additional exemplars of a smartphone or other power supply connectable heater and cartridge interface 444. The smart heater head 452 has a I/O plug 453 for a I/O on a smart phone or other power supply, it also has at least a controller 30 and an on/off switch 446. A slave heater 454 is shown in FIG. 25 which has no controller—but rather through the I/O leverages the control processing power of a smart phone or other device with a microprocessor and/or controller.

FIG. 26 is a flow diagram of aspects of a method of operation of a zone cartridge heating system utilizing a heater and cartridge. Not all steps are required a subset with fewer decisions are within the scope of this disclosure. First a controller using one or more of decision engines and rule engines, decides if a cartridge is present in a receiver 460. A sensor including but not limited to actuators which may be optical, magnetic, mechanical or electrical is switched on if a cartridge is present. If no cartridge in receiver, then the controller decides do not heat 461. The controller then determines if a previous cartridge had been removed 462 which would indicate a new cartridge is present. Optionally the controller may review its memory to determine if the cartridge in the receivor is used 463. If a used cartridge the controller may decide do not heat 461. Signs of used would include, but are not limited to, a frangible tabs broken, a heat effected region on the cartridge identified by an optical sensor as being previously heated, a unique identifier code optically scanned and determined by memory to have been previously used. If the cartridge is determined to be new the controller will start or initiate the sequence of heating 465. If a cartridge was previously in the receiver the controller will determine if the entire heating cycle of the last zone heated was competed 466. If a new cartridge is being heated the controller will determine when the heating of the current zone is completed 466. If the cycle time to heat a zone is not competed the controller will allow the device to continue to heat the zone 467. If the cycle time to heat a zone is competed the controller will determine if additional zones are available to heat 468. If yes, then the controller will continue to power the heating of the next remaining zone 469.

A multizone heater will have two or more heating elements forming zones, a cartridge will be inserted and will remain in place during heating. The zones are selected by the controller turning on or off power to different heating elements.

For a single heating element used to heat multiple zones of material in a cartridge the user moves the cartridge. For a moving cartridge additional controller steps are illustrated. The controller will alert the user to move the cartridge 470. That alert is via a visual, auditory or other communication such as an LCD screen icon, a LED blinking or changing color or a sound. The controller will then determine if the user moved the cartridge to a next zone 471. Determination of movement of the cartridge is generally the same type of sensor or actuator used to determine if the cartridge has been inserted.

The controller accesses a look up table (LUT), set by the user or set by the software to keep the temperature of one of the manifold and the area near the cartridge at the SET. The controller clock also measures the time the heating element is at SET or the time the cartridge or a selected portion thereof is exposed to temperature at SET. The time may be fixed or variable.

FIG. 27 illustrates aspects of a control sequence and sequence of operation of one or more exemplary implementations disclosed herein. First a cartridge is inserted into a heater unit and the on/off switch is depressed 602. Optionally, a mechanical, optical, or electro-mechanical fixture limits the orientation of the cartridge to a predefined one 604. Optionally, a sensor collects data on the cartridge to determine if it is used 605. If used 607 keep heater off until a new cartridge is added. If cartridge is not used then start power initiation and heat $1^{st}$ module 610, heat until user selects "off" or controller shuts off. Determine if cartridge has been removed 615. If removed 617 then rest sequence of operation. If not removed 619 heat next module until user or controller shuts off. Next determine if sequence of heating is complete 620. If not complete then heat cartridge unless cartridge has been removed 615, else reset 617. If cartridge heating sequence is complete (all heating zones have been heated) then keep heater off until a new cartridge is provided 607.

FIG. 28 illustrates aspects of a control sequence and sequence of operation of one or more exemplary implementations disclosed herein. First a cartridge is inserted into a heater unit and the on/off switch is depressed 640. Optionally, a sensor collects data on the cartridge to determine if it is used 642. If used 643 keep heater off until a new cartridge is added. If cartridge is inserted and not used (optional) then start power initiation and heat of heater element 650, heat until user selects "off" or controller shuts off. Next, determine if cartridge has been removed 652. If removed then rest sequence of operation 653. In the case of a movable cartridge if not fully removed determine by position if cartridge has been rotated or slid up or down in the receivor to a new region 654. If not moved to new zone for heating then do not heat and optionally warn user with communication/indicator such an LED illumination, a vibration, or an audible sound regarding the need to move cartridge 655. If moved then heat until user or controller shuts off heating new region 656. Next determine if sequence of heating is complete 657. If no heat cartridge, if cartridge has not been removed 652 and if it has been moved 655.

FIG. 29 shows aspects of an operational system for the systems and devices disclosed herein. A battery 25 is conductively connected to an on/off switch 701 then a controller 703. The controller 703 receives input from one or more of temperature sensor 34, positional sensor 305/306, data collection 709 (such as data on cartridge, RFID on cartridge, optical on cartridge) and communicates with Memory 710 to determine status of cartridge—is it new, used? Has it been moved? Have all heating zones been heated? The controller also can provide/communicate to the user visual or audio feedback to the user via status indicators 712 such as led lights, vibration device (known in the art including but not limited to motors, piezo and other solid state items), or chirps like sounds from a microprocessor.

It will be understood that various aspects or details of the disclosures may be changed combined, or removed without departing from the scope of the invention. It is not exhaustive and does not limit the claimed inventions to the precise form disclosed. Furthermore, the foregoing description is for the purpose of illustration only, and not for the purpose of limitation. Modifications and variations are possible in light of the above description or may be acquired from practicing the invention. The claims and their equivalents define the scope of the invention.

What is claimed is:

1. A system of heating without combusting material within a disposable consumable, comprising:
- a disposable consumable having an inhalation end and containing a material to be heated in a containment end;
- a receivor with a key guide configured to retain and deform frangible sections of the inserted consumable;
- at least one beating clement and at least one temperature sensor in thermal communication with the receivor;
- a power supply;
- a controller in signal communication with the power supply, the at least one heating element and the at least one temperature sensor configured to stop heating if said consumable is removed from the receivor; and,
- wherein the containment end is formed of at least paper and metal.

2. The system of heating without combusting material within a disposable consumable of claim 1 wherein the material contains at least tobacco.

3. The system of heating without combusting material within a disposable consumable of claim 1 wherein the controller is configured to communicate states of heating or not heating to the user.

4. The system of heating without combusting material within a disposable consumable of claim 3 wherein the communication to the user is by way of illumination.

5. The system of heating without combusting material within a disposable consumable of claim 3 wherein the communication to the user is by way of a vibration.

6. The system of heating without combusting material within a disposable consumable of claim 1 wherein key guide at least one of deforms at least a portion of the consumable.

7. A system of heating without combusting material within a disposable consumable comprising:
- a disposable consumable having an inhalation end and containing a material to be heated in a containment end;
- a receivor with a key guide configured to retain and deform frangible sections of the inserted consumable;
- at least one beating element and at least one temperature sensor in thermal communication with the receivor;
- a power supply;
- a controller in signal communication with the power supply, the at least one heating element and the at least one temperature sensor configured to stop heating if said consumable is removed from the receivor:
- wherein key guide at least one of deforms at least a portion of the consumable; and,
- wherein a volume of air is heated in the receivor between the consumable and interior wall of the receivor.

8. The system of heating without combusting material within a disposable consumable of claim 7 wherein at least a portion of the volume of heated air is passes through the consumable when a user inbales on the inhalation end of said consumable.

* * * * *